(12) United States Patent
Allan et al.

(10) Patent No.: US 6,338,840 B1
(45) Date of Patent: Jan. 15, 2002

(54) PROCESS AND APPARATUS FOR THE PRODUCTION OF A DEODORANT OR ANTIPERSPIRANT COMPOSITION

(75) Inventors: Peter Stewart Allan, Uxbridge; Elaine Susanne Bibby, Wirral; Michael Andrew Browne, Wirral; Elfriede Maria Langeveld, Wirral; Paul Lloyd, Wirral; Reginald Manley, Wirral; Robert J Owen, Mid Glamorgan Wales; Paul Riessen Rennie, Wirral; Jean Lesley Scott, Wirral; Frederick Edmund Stocker, Wirral; Karnik Tarverdi, Uxbridge; Jacqueline Maria Thorpe, Wirral, all of (GB)

(73) Assignee: Unilever Home & Personal Care USA, division of Conopco, Inc., Chicago, IL (US)

( * ) Notice: Subject to any disclaimer, the term of this patent is extended or adjusted under 35 U.S.C. 154(b) by 0 days.

(21) Appl. No.: 09/413,277

(22) Filed: Oct. 6, 1999

(30) Foreign Application Priority Data

Oct. 6, 1998 (GB) .............................. 9821778

(51) Int. Cl.⁷ ............................ A61K 7/32; A61K 7/00; B28B 17/00
(52) U.S. Cl. ....................... 424/65; 264/102; 264/297.8; 264/328.16; 425/144; 425/145; 425/149; 425/547; 425/549; 424/66; 424/67; 424/68; 424/400; 424/401
(58) Field of Search .............................. 424/65, 66, 67, 424/68, 400, 401, DIG. 5; 264/102, 211.11, 297.8, 328.2, 328.16, 328.18, 328.8, 330; 425/144, 145, 149, 174.2, 547, 549, 803, DIG. 32

(56) References Cited

U.S. PATENT DOCUMENTS 4,678,420 A 7/1987 Inoue
4,688,609 A 8/1987 Diaz
4,722,836 A 2/1988 Geary et al.

(List continued on next page.)

FOREIGN PATENT DOCUMENTS

EP 0028853 5/1981
FR 2194113 2/1974

(List continued on next page.)

OTHER PUBLICATIONS

Search Report under Section 17 Application No. 98218778.9 and International Search Report mailed Oct. 4, 1999.

Primary Examiner—Shelley A. Dodson
(74) Attorney, Agent, or Firm—Matthew Boxer

(57) ABSTRACT

In a first aspect, a process for forming deodorant or antiperspirant sticks by continuously forming a mobile composition for dispensing into containers or molds at a rate matched with the rate at which it is dispensed, and in other aspects a process in which a mobile deodorant or antiperspirant composition is dispensed by injection molding, i.e. a process in which the deodorant or antiperspirant composition is dispensed under pressure. The composition at the time of injection moulding is preferably either in the vicinity of its regular set temperature, particularly in the range of about 0–3° C. below the regular set temperature and/or partially structured at the time of its delivery it into a container or mold. The deodorant or antiperspirant composition is preferably continuously produced in a screw extruder, especially a twin screw extruder, which is controlled to deliver the composition in a substantially semi-solid state, at a temperature close to its regular set temperature and is injected into the container or barrel at a pressure at the point of injection that is often greater than 15 psi. and in many instances from 200 to 400 psi in the injection head. Apparatus for forming deodorant or antiperspirant sticks by injection molding is also described. The combined process offers benefits for incorporating sensitive ingredients and ameliorating sedimentation of particulates such as particulate antiperspirant actives.

53 Claims, 3 Drawing Sheets

U.S. PATENT DOCUMENTS

| | | |
|---|---|---|
| 4,897,236 A | 1/1990 | Rabiger et al. |
| 5,316,712 A | 5/1994 | Ono et al. |
| 5,607,681 A | 3/1997 | Galley et al. |

FOREIGN PATENT DOCUMENTS

| | | |
|---|---|---|
| GB | 1034948 | 10/1964 |
| GB | 2060084 | 4/1981 |
| WO | 94/28866 | 12/1994 |

PROCESS AND APPARATUS FOR THE PRODUCTION OF A DEODORANT OR ANTIPERSPIRANT COMPOSITION

TECHNICAL FIELD

The present invention relates to a process and apparatus for forming a deodorant or antiperspirant composition, and particularly to compositions suitable for forming into sticks, to a process and apparatus for forming such sticks and to such sticks obtained thereby.

BACKGROUND AND PRIOR ART

Deodorant or antiperspirant sticks are conventionally manufactured by casting. In conventional casting processes, the constituents of a deodorant or antiperspirant stick composition are mixed in a large vessel, and heated to form a molten composition. Whilst the composition is in a mobile and readily pourable state, it is poured into the its container of the desired shape, which is sometimes called a barrel, and sometimes called a canister. Hereinafter, reference to a barrel includes reference to a canister. The composition is thereafter cooled until it solidifies. The barrel is either capped or bottomed, depending on whether bottom fill or top fill has been employed. If the barrel has been bottom filled, the bottom, including for example a mechanism for moving the stick along the barrel, is usually inserted whilst the composition is still sufficiently fluid or the mechanism defines an aperture through which the barrel can be filled.

There are several disadvantages associated with preparing a large volume of molten deodorant or antiperspirant composition for batch processing. The composition usually remains in a molten state for a long period, and particularly that towards the end of the batch. During this period, heat is dissipated, thereby increasing the overall energy consumption for the process. Secondly, the maintenance of a relatively high temperature needed to keep the composition molten for an extended period can not only cause the degradation of some common constituents, such as the oxidation of waxes or fats, resulting potentially in rancid odours that need to be masked by additional perfume, but also constrains the incorporation of heat sensitive constituents, such as any perfume itself, on account of the likelihood that they will be impaired before the sticks are formed. In addition, the conventional batch process is poorly suited to switching between different formulations in view of the time taken to cleanse the apparatus between batch preparations to avoid cross contamination.

One major problem associated with a casting process for deodorant or antiperspirant compositions is that they tend to shrink within the stick barrels as they cool. This is highly undesirable because shrinkage can adversely affect the visual appearance of the stick. Shrinkage can take the form of dimples, or voids, or a depression at the fill point of the stick. This problem becomes apparent particularly when the stick barrels are filled from the top. On the other hand, bottom filling of stick barrels is often more wasteful of material.

A second major problem arises because the composition must be kept mobile whilst it is being fed from its production/storage vessel to the filling station so as to avoid line blockage which would be extremely disruptive to production. In practice, this means that during the casting operation, the composition is usually introduced into the barrel at a temperature that is still significantly above its set temperature. As a consequence, the composition is likely to remain for a relatively long period of time within the barrel in a mobile state during which segregation can arise, particularly in respect of particulates, such as active antiperspirant materials, intended to be distributed reasonably evenly throughout the composition. Segregation is inherently undesirable for users of the stick, because its performance can vary depending on how much of the stick has been consumed.

Therefore, there is a need for a process and apparatus that is capable of forming deodorant or antiperspirant compositions into good quality sticks (i.e. sticks, for example, having a good appearance and physical characteristics) which overcomes or ameliorates one or more of the problems identified hereinbefore or disadvantages associated with the existing casting process.

In WO 94/28866, Gillette describes a modification of a conventional batch process for making antiperspirant sticks which avoids the formation of agglomerations of antiperspirant particles by controlling the processing temperature during the batch processing. Thereafter, they advocate that the stick composition is cooled to within the range of 1–10° C. above, and preferably, 1–4° C. above the solidification point of the solution suspending the antiperspirant and then poured into moulds. Whilst this modification may alleviate the formation of agglomerates of actives, it does not address various other aspects of a batch/pour mould method as indicated above.

In U.S. Pat. No. 4,722,836 to Geary et al, assigned to American Cyanamid Company, there is described an antiperspirant stick in which the segregation of an antiperspirant can be reduced by employing a material which has a surface area of at least $2m^2/g$ by the BET method using nitrogen. This is of limited value to manufacturers of antiperspirant compositions in that the process is not applicable to any antiperspirant material having a surface area of below $2m^2/g$, and introduces an extra step into the manufacturing process, namely determining the surface area for all batches of material that are contemplated for use. Moreover, it does not address various other aspects of a batch/pour mould method as indicated above.

Apparatus and methods for injecting thermoplastics into moulds are known and used. For example, in U.S. Pat. No. 4,678,420 to Inoue, assigned to Inoue-Japax Research Inc, there is described apparatus in which a thermoplastic is fed through a hopper into a single screw mixer, plasticised and injected into a mould. Such apparatus and methods do not provide teaching that is directly applicable to deodorant or antiperspirant compositions, due to very different structuring mechanisms.

In U.S. Pat. No. 4,688,609 (Diaz) assigned to Fluid Packaging Company, there is described a system for automatically dispensing metered amounts of deodorant composition into stick barrels in which a large vat of molten deodorant composition is produced, and progressively delivered into stick barrels through dispensing apparatus injected at an operating pressure of 10–15 psi and within which the composition is maintained in a molten state by hot water jackets. The disclosure provides no teaching as to how to ameliorate or overcome the disadvantages of a batch manufacture process. Likewise, the document is silent about injection of a deodorant composition which is at least partially structured and another means to tailor an injection process to antiperspirant or deodorant compositions.

In U.S. Pat. No. 5,316,712 to Ono et al assigned to JO Cosmetics Co Ltd, there is described a process for producing solid cosmetics in which a cosmetic base containing a powder and oil is fed into a single screw which rotates within a heated chamber to mix and heat the constituents. The screw reciprocates within the chamber to inject the cosmetic base into a mould. The process is applied to producing cosmetics such as lipstick eye-shadow or foundation having an extremely high content of particulate materials such as talc or mica under high shear and very high pressure conditions without cooling to the vicinity of the set temperature of the cosmetic base. Such a combination of conditions is not applicable to the satisfactory injection moulding of deodorant or antiperspirant compositions.

The present inventors have found that some of the problems associated with the prior art processing of deodorant or antiperspirant compositions can be ameliorated or overcome by employing a continuous method for producing or dispensing a mobile feed of the deodorant or antiperspirant composition for supply to apparatus for dispensing the composition into stick containers.

The present inventors have also found that some or other problems associated with prior art processing of deodorant or antiperspirant compositions to produce sticks can be ameliorated or overcome by injecting a mobile deodorant or antiperspirant composition into a stick container at an elevated pressure, and at a temperature controlled above its structure impairment temperature. For preference, the inventors so control the temperature that the composition is at least partially structured at the moment when it is injected into the barrel.

The present inventors have further found that in especially beneficial embodiments, at least some of the problems associated with the prior art processing of deodorant or antiperspirant compositions can be ameliorated or overcome by employing a continuous method for producing or dispensing a mobile feed of the deodorant or antiperspirant composition to apparatus in which the composition is injected into a stick container at an elevated pressure, and at a temperature controlled above its structure impairment temperature.

SUMMARY OF THE INVENTION

By employing a continuous method for producing a mobile feed, it is possible to reduce significantly the inventory of molten material, to reduce energy consumption during processing, to minimise oxidation of constituents and to minimise any deleterious effects on heat-sensitive constituents.

Alternatively or additionally, by injecting a mobile deodorant or antiperspirant composition into a stick container at an elevated pressure, and at a temperature controlled above its structure impairment temperature and for preference so controlled that the composition is partially structured at the moment when it is injected into the container, good quality sticks can be obtained and the problems of shrinkage, inhomogeneity, and segregation of ingredients within the container are significantly reduced. In addition, production benefits such as shorter cooling times for the sticks are also achievable, and/or the reduction of cooling capacity for the sticks, possibly even as far as the total absence of cooling capacity.

The inventors have further recognised that the containers for deodorant or antiperspirant sticks employed herein, need not comprise the packaging in which the stick is eventually distributed, but, if desired, could comprise moulds which are subsequently released from deodorant or antiperspirant sticks after the sticks have cooled, preferably for re-use. Hereinafter, the term container is employed in respect of packaging in which the stick is distributed and mould which is intended to be separated from the stick before it is distributed.

Thus, according to a first aspect of the present invention there is provided a process for forming deodorant or antiperspirant sticks comprising mixing deodorant or antiperspirant constituents to form a composition, simultaneously or subsequently heating a deodorant or antiperspirant composition to form a mobile composition and delivering the mobile composition into a dispenser for filling containers or moulds characterised in that the mobile composition is produced continuously by continuously introducing the constituents through a plurality of inlets into a screw extruder at a rate matched with its immediate dispensation by the dispenser into the containers or moulds.

According to a related aspect of the present invention there is provided a process for forming deodorant or antiperspirant sticks comprising mixing deodorant or antiperspirant constituents to form a composition, simultaneously or subsequently heating a deodorant or antiperspirant composition to form a mobile composition and delivering the mobile composition into a dispenser for filling containers or moulds characterised in that the mobile composition is produced continuously by continuously introducing the constituents into a screw extruder having two parallel screws with intermeshing flights or a non-reciprocating screw extruder at a rate matched with the immediate dispensation of the composition by the dispenser into the containers or moulds.

By controlling the production of the mobile composition to match the rate at which the composition is dispensed into the containers or moulds, and in effect producing the mobile material on demand from its constituents and at the rate set by the dispensing equipment, the inventory of material at an elevated temperature, such as molten material, is controlled to at or near a minimum. This also has the effect of minimising the period whilst the material is kept at an elevated temperature before it is dispensed into its containers, thereby reducing heating costs and the period during which constituents can oxidise or degrade, eg heat sensitive constituents.

It is particularly desirable to employ a screw extruder as an in-line compounder to produce a mobile deodorant or antiperspirant composition continuously at a rate matched with the rate at which the composition is dispensed into the containers or moulds.

According to a second aspect of the present invention, there is provided a process for forming deodorant or antiperspirant sticks comprising heating a deodorant or antiperspirant composition to form a mobile composition and delivering the mobile composition into a dispenser for filling containers or moulds characterised in that the mobile composition is transported continuously from a fluid supply to the dispenser by a screw extruder having two parallel screws with intermeshing flights or a non-reciprocating screw extruder, at a rate matched with its immediate dispensation by the dispenser into the containers or moulds, the screw extruder optionally being adapted to introduce thereinto one or more constituents of the antiperspirant or deodorant composition.

A screw extruder represents a practical and beneficial means to transport a mobile deodorant or antiperspirant composition at a controllable rate to a dispenser that enables the composition to be mixed effectively or kept mixed during transportation, using appropriately designed mixing elements and optionally also offers an opportunity for introduction and mixing of constituents such as heat or oxidation sensitive constituents into a mobile composition, possibly shortly before the composition reaches the dispenser.

The aspect of producing the fluid deodorant or antiperspirant composition continuously can, if desired, be combined with the aspect of continuously transporting the fluid composition using a screw extruder towards a dispenser, either sequentially linked, or by a screw extruder with appropriate infeed means for some or all of the constituents of the composition and means for heating and temperature control of the composition during its transportation along the screw.

The dispensing of mobile material into containers or moulds in a single line is punctuated by alternate periods when material is not being dispensed, particularly whilst a filled container or mould is being removed from the dispensing station and replaced by an empty container or mould. In order to accommodate continuous production of mobile material and its intermittent dispensing, it is highly desirable to interpose a buffer chamber between the means for continuously producing or transporting the mobile composition and the means for dispensing it into containers or moulds, the buffer chamber being dimensioned to hold at least the volume of composition produced whilst filling is not taking place.

According to a third aspect of the present invention, there is provided a process for forming deodorant or antiperspirant sticks comprising heating a deodorant or antiperspirant composition to form a mobile composition and delivering the mobile composition into a dispenser for filling a container or mould characterised in that the mobile composition is injected into the container or mould under a pressure of above 15 psi in the injection head for at least a fraction of the time in which the composition is being introduced into the container or mould.

According to a fourth aspect of the present invention, there is provided a process for forming deodorant or antiperspirant sticks comprising heating a deodorant or antiperspirant composition to form a mobile composition and delivering the mobile composition to a dispenser for filling a mould characterised in that the mobile composition has a temperature that is higher than its structure impairment temperature and below its regular melting temperature at the time when it is injected into the container or mould.

By controlling the deodorant or antiperspirant composition to within a desired temperature range at the location and time where the composition is introduced into the mould and in particular controlling the temperature to below the regular melting point of the composition at that location and time, it is possible to shorten and most preferably substantially eliminate the period after introduction of the composition into the mould when segregation can occur, thereby minimising or eliminating the problem of particulates segregation. Such a process also reduces the extent of heat to be removed from the container or mould before the stick solidifies and affects the crystalline structure of the stick. The regular melting point of the composition is the temperature at which a solid composition which is being heated slowly in a beaker in ambient conditions (particularly at 1 atmosphere pressure) becomes capable of flowing under its own weight. The structure of the composition is impaired if it is injected at too low a temperature. Herein, such a temperature is called the structure impairment temperature (sit for short). There is a close relationship between sit and the regular setting temperature of the composition, rst for short. The rst is that at which a stirred sample being cooled in ambient air (about 20° C.) is judged by eye to cease to be mobile. The compositions can be injected moulded at temperatures below the rst. The sit is normally a few degrees below the rst. By employing a suitable injection temperature, it is possible to avoid excessive shearing of the composition during the injection process that would damage the physical structure of the composition, for example if too low an injection temperature were employed.

In a fifth aspect related to the fourth aspect of the present invention, there is provided a process for forming deodorant or antiperspirant sticks comprising heating a deodorant or antiperspirant composition to form a mobile composition and delivering the mobile composition to a dispenser for filling a container or mould characterised in that the mobile composition is at least partially structured at the moment that it is injected into the container or mould.

In accordance with the fifth aspect, and where the deodorant or antiperspirant composition comprises an emulsion, it is preferably the continuous phase of the composition which is at least partially structured.

In the present invention, deodorant or antiperspirant compositions are considered to be at least partially structured if they have developed structure that is detectable by physical techniques, for example when a pattern is generated in X ray diffraction or when the composition has a temperature in the vicinity of its rst, and especially if it is below its rst. Other means for introducing structure can comprise fibrous networks. Additionally or alternatively, deodorant or antiperspirant compositions can be considered to be at least partially structured if they contain a gellant/structuring agent and the temperature of the composition is between its nucleation and setting temperature. Preferably, the deodorant or antiperspirant composition is in a semi-solid state when dispensed into the container or mould under pressure.

According to a sixth aspect of the present invention, there is provided apparatus to produce a deodorant or antiperspirant composition in a mobile form suitable for dispensing into containers therefor, particularly continuously, and more particularly at a rate matched with the rate at which the dispensing means introduces the composition into the containers. In accordance with this aspect of the invention, the apparatus can comprise means to bring the composition to a temperature at which it is mobile, and can likewise comprise means to transport the composition in mobile form to a dispensing station.

According to a further aspect of the present invention, there is provided apparatus for dispensing deodorant or antiperspirant composition by injection moulding into moulds. More particularly, in the present invention, there is provided a means for feeding mobile deodorant or antiperspirant composition to a means for applying pressure during the dispensing of the composition into their containers or moulds.

Thus, the present invention provides an apparatus for forming deodorant or antiperspirant sticks comprising a means for applying pressure to a deodorant or antiperspirant composition to deliver the composition to a container or mould and a substantially separate means adapted for feeding deodorant or antiperspirant composition to the means for applying pressure.

The means for feeding deodorant or antiperspirant composition to the means for applying pressure can comprise the apparatus for continuously producing mobile material, directly or via a buffer chamber.

The deodorant or antiperspirant composition can be introduced into the means for feeding in any suitable state, such as, for example, fluid, semi-solid or particulate form.

It has been discovered that a particularly effective means of feeding a deodorant or antiperspirant composition, including particularly compositions supplied in a mobile state, to a dispenser, which can comprise especially an injection moulding process is provided by means of at least one screw extruder which enable a mobile composition such as molten or semi-molten material to be fed continuously.

Thus, the feeding means preferably comprises a screw feeder. The screw feeder can comprise a screw extruder suitable or adapted for in-line compounding.

In another aspect of the present invention, there is provided a deodorant or antiperspirant stick obtainable by the process of the present invention and particularly a stick obtainable by an injection moulding process or apparatus in accordance with respectively any of the third to sixth aspects of the present invention.

In a related aspect, the invention provides a deodorant or antiperspirant composition in stick form in which a carrier containing a dispersed or dissolved antiperspirant or deodorant active is structured with sufficient structurant to obtain a solid stick characterised in that the structurant comprises particles evenly distributed through the composition.

By the application of an injection moulding technique, and especially a technique operated in the region of the regular setting temperature of the composition, such as above the structure impairment temperature up to about the regular setting temperature, eg up to the regular setting temperature itself or up to about 2° C. above the regular setting temperature, it is possible to produce a solid product in which the structurant forms small particles, often small crystals that are evenly distributed throughout the stick, both axially and radially. This differs from sticks which are produced by conventional casting techniques in which the structurant typically forms radially extending oriented crystals in a region between an inner core and an outer wall layer for example when waxes are employed as structurants. Although not wishing to be bound by any theory, it is believed that the difference in the distribution of structurant crystals between a suitably controlled injection moulding technique and a conventional casting technique arises at least in part from the simultaneous formation of structurant crystals widely distributed throughout the composition when such an injection moulding technique is employed.

It has been found that the process of the invention is well suited for incorporating additive or benefit agents such as those which are immiscible with other Constituents in the deodorant or antiperspirant composition and/or which can degrade or interact destructively with some other constituent when subjected to heat and particularly heat for a prolonged period. Accordingly, the present invention provides deodorant or antiperspirant sticks obtainable by the process of the present invention comprising a deodorant or antiperspirant composition containing one or more constituents which are readily oxidised and/or are sensitive to prolonged heat. Alternatively they could be immiscible with other constituents of such compositions.

In a still further aspect, the present invention provides for a method for incorporating a sensitive or oxidisable constituent into a deodorant or antiperspirant composition, comprising adding the sensitive or oxidisable constituent to a deodorant or antiperspirant composition which is at least partially structured or adding it immediately prior to being cooled to a temperature at which it becomes partially structured and applying a pressure to the deodorant or antiperspirant composition containing the sensitive or oxidisable constituent so as to deliver it to a container or mould.

In a preferred embodiment, the sensitive or oxidisable constituent is miscible with the deodorant or antiperspirant composition or one phase thereof.

References herein to the invention or to any preferred features apply to all aspects of the invention, unless expressly referring to a specified aspect or aspects.

DETAILED DESCRIPTION OF THE INVENTION

By "deodorant or antiperspirant stick" is meant a coherent solid mass containing one or more deodorant and/or antiperspirant active constituents. Conventionally sticks adopt the form of solid rods, which are usually housed within a barrel container, typically of circular or elliptical cross section, that is open at one end through which the stick can protrude. However, other shapes, such as tablets, cakes or bars can be contemplated alternatively and likewise other container shapes for the sticks.

The deodorant or antiperspirant compositions can comprise homogeneous mixtures, such as solutions, or heterogeneous mixtures of components, such as emulsions, or can comprise material suspended or dispersed in a continuous phase. Some particularly desirable compositions comprise one or more particulate antiperspirant active materials suspended in a continuous phase provided by some or all of other constituents.

Mobile Composition Production

Continuous production of an antiperspirant or deodorant compositions in mobile form can be effected very conveniently employing a screw extruder equipped with a plurality of infeed ports for solid and liquids spaced axially along the screw, which enable the constituents to be introduced into the screw extruder in an order which takes into account their individual characteristics. Particularly, it is desirable to employ screw extruders which have a series of segments each of which have heating or cooling elements, thereby enabling the user to establish a temperature profile for the composition and its constituents as it is introduced into and conveyed through to the extruder outlet.

The relative order of introduction of the constituents into the extruder is at the discretion of the user, who will normally take into account their known properties, so as to optimise processing. It is preferable for the carrier and structurant to be in fed in the first or early segments. By introducing both at an early stage, it is possible to produce a fluid mass into which other constituents such as particulate antiperspirant or deodorant actives can be introduced. It is highly desirable to introduce sensitive additives for example readily oxidisable or heat-sensitive additives or agents, such as perfumes, in a segment at or close to the outlet from the extruder, thereby enabling such an additive or agent to be introduced towards the end of the processing, thereby reducing and preferably minimising the length of time that the additive is exposed to elevated temperatures. It will be understood that sensitive additives can also include materials which interact deleteriously with each other or other constituents of the composition whilst it is fluid, especially molten and that reference hereinafter to oxidisable or heat sensitive additives reads on to such other sensitive additives. It will be recognised that such a choice of point of addition for such oxidisable/heat sensitive additive is likewise applicable where the screw extruder is used for partial in-line compounding, the remaining constituents being premixed and delivered to the inlet end of the conveyer in either solid or molten form.

The temperature profile of the screw extruder advantageously employs a high temperature at or near the point of introduction of structurant and carrier, preferably enabling them to form a molten mass, and most suitably in subsequent segments the temperature is controlled progressively lower.

This further can reduce degradation of heat sensitive agents that are preferably introduced in segments where a lower temperature is maintained. The temperature of the composition on exiting from the screw conveyer can be controlled to at or slightly above the temperature at which it is intended to be dispensed, though preferably not more than a few degrees below its regular setting temperature.

Where the composition is intended to be dispensed employing a casting technique, as in a class of process according to the first aspect of the present invention, the technique commonly employed commercially, the screw extruder preferably includes a suitable final segment or segments to bring the composition to a suitable temperature for casting, for example if the composition has previously been cooled to enable heat sensitive additives to be incorporated at a lower temperature. This may comprise a final segment to reheat it to its melting temperature. When a cast technique is employed, the formulation is normally maintained at a temperature of several degrees above the regular setting temperature of the formulation, such as from 5 to 10° C. above. Employment of a smaller temperature difference increases the risk of line blockage between the screw extruder and the cast nozzle, for example to or from a holder tank typically deployed above the filling station to permit the fluid formulation to flow under gravity into the barrel or other container.

Where the dispenser comprises injection moulding apparatus, which is preferred and itself comprises several aspects of the present invention, the final segment or segments often provide cooling in order to bring the composition temperature to a little above its structure impairment temperature, and particularly to within the temperature range (such as those indicated hereinafter) at which it is most beneficial to inject into the container or mould.

The infeed rates of the constituents of the composition, the dimensions of the screw and its rotation rate and the rate at, which the fluid composition is dispensed are all advantageously adjusted to produced matched production and dispensing. Likewise, other screw characteristics, such as pitch of the screw flight are chosen in accordance with the viscosity of the composition, for example to control the pressure in the extruder, eg to enable gas to be vented or to ease addition of constituents and regulate transportation of the composition. It is highly desirable for the screw extruder to comprise a plurality of parallel screws, single flighted and intermeshed, and in many instances co-rotational, in order to transport the mobile composition most suitably to the outlet. Two such parallel screws are most convenient in order to provide a forward pumping action, especially when the composition has a comparatively low viscosity. The screw or screws are preferably fitted with discs or other means, for example at or near the outlet to provide back pressure.

Use of the temperature controlled screw extruder enables antiperspirant or deodorant compositions to be produced continuously with minimum inventory, especially at elevated temperature and minimum delay before they are dispensed. This very short processing time is especially beneficial for constituents that are sensitive to elevated temperatures or air oxidation.

It is also possible to obtain a marbling or speckled effect in sticks produced by injection moulding composition produced in a suitably controlled screw extruder. This can be achieved by feeding a fluid, but preferably viscous coloured material into the antiperspirant or deodorant composition, and especially shortly before the composition is injected into the container or mould. It is desirable to introduce the marbling material in the last or possible the next to last infeed point in the screw conveyer, for example in the same segment as or after the segment in which a heat sensitive constituent would be introduced, or possibly into a suitably modified injection apparatus. The differently coloured material is often a viscous pigmented oil and the extent to which the material mixes with the remainder of the composition is reduced or minimised, not only by selecting a late infeed point, but also because at that point, the composition into which it is fed is likely to be at or near its coolest and thus also be at its most viscous. The effect can be varied by varying the relative proportions of the marbling material and the remainder of the composition and by varying the manner in which the material is introduced, such as in a continuous stream or intermittently, and/or by employing more than one differently coloured materials. It is particularly desirable to control the temperature of the composition during or after introduction of any marbling material, and especially within the range of from above the structure impairment temperature to not more than 5° C. above its regular setting temperature. An alternative means to introduce structure into the composition can also be desirable, eg as indicated below.

For the transport and mixing of antiperspirant or deodorant compositions, a screw extruder can be employed that is similar in operation to that employed as an in-line compounder, as described above, but it does not need many of the ports for in-feeding the constituents separately.

Injection Moulding

Deodorant or antiperspirant compositions to be delivered to the container or mould can be in any form capable of being delivered into the container or mould. For example, the composition can be in a substantially fluid form (e.g. molten, molten dispersion, liquid), substantially semi-solid or substantially plastic solid form, so long as the composition is sufficiently mobile to allow the pressure applying means to deliver it into a container or mould as would be understood by the person skilled in the art.

Structure

The presence of at least partial structure in the deodorant or antiperspirant composition is advantageous and can be ascertained by comparing it with a deodorant or antiperspirant composition which is similar to and at the same temperature as the deodorant or antiperspirant composition under consideration, except for having no structure and/or structuring agent present, or of substantially the same composition at a temperature above its nucleation temperature whereby it can be determined by for example X Ray Diffraction or other techniques whether structure is observable.

Structure can be provided, for example, by liquid crystal formation, or by incorporating a polymeric structuring agent such as polyamides or polysiloxane elastomers or an inorganic gellant like a clay or an organic gellant which is not polymeric such as selected dibenzoyl alditols (eg dibenzoyl sorbitol) or selected n-acyl amino derivatives (eg N-acyl glutamide derivatives) or selected hydroxyfatty acids (eg 12-hydroxystearic acid) or selected sterols (eg cholesterol) or selected secondary amides of di or tri basic carboxylic acids, (eg 2-dodecyl-N,N'-dibutylsuccinimide), or a waxy material such as fatty alcohols (eg stearyl alcohol) or a wax or by incorporating a sufficient volume of a dispersed solid component within a continuous liquid phase such that it will increase the viscosity. Gellants often provide structure in the carrier by forming a network, such as a fibrous network, within the composition. A solid component can provide structure by interacting to form a network within the deodorant or antiperspirant composition or through the simple physical interaction/contact of the solid particles with one another or with one or more components of the continuous phase.

Structured deodorant or antiperspirant compositions are usually obtained by introducing one or more structurants for example, waxes, gellants or elastomers (eg crosslinked partially crosslinked or non-crosslinked organopolysiloxanes), or inorganic thickeners such as clay, silica and/or silicate material (including in situ formed aluminosilicates) and a contribution to composition thickening can be provided by particulate antiperspirants such as aluminium and/or zirconium salts. The invention in-line compounding and injection moulding processes described herein are particularly suitable for formulations employ one or more wax structurants.

Structurants are normally incorporated in the deodorant or antiperspirant composition at concentrations sufficient to impart coherence to the solid material, and the actual concentration depends on the chemical nature of the structurant. In many instances, the structurant, other than an active antiperspirant compound, is selected in the range of from 0.1 to 60% by weight and the antiperspirant is often selected in the range of from 1 to 40% by weight of the deodorant or antiperspirant composition. Further composition preferences are described hereinafter.

The existence of internal structure in the deodorant or antiperspirant composition may be due to the components used, their concentration, the temperature of the composition and the shear to which the composition is being or has been exposed.

The presence of such internal structuring, ordering or anisotropy may be typically revealed by the temperature/viscosity/shear profile of the composition in a manner known to the person skilled in the art. In some instances, the presence of structure gives rise to non-Newtonian fluid behaviour.

The presence and identity of a crystal structuring system in a deodorant or antiperspirant composition may be determined by means known to those skilled in the art. In addition to or substitution for X-ray diffraction, for example, optical techniques, various rheometrical measurements, neutron diffraction, and sometimes, electron microscopy can be employed. As will be known to the person skilled in the art, structure may be detected by the use of polarised light microscopy. Isotropic phases have no effect upon polarised light, but anisotropically structured phases will have an effect upon polarised light and may be birefringent. An isotropic liquid would not be expected to show any kind of periodicity in X-ray or neutron diffraction micrographs, whereas structure may give rise to first, second or even third order periodicity, in a manner which will be known to the person skilled in the art.

Preferably, the deodorant or antiperspirant composition is in a semi-solid state when delivered to the container or mould. A deodorant or antiperspirant composition may be considered to be in a semi-solid state if sufficient structure is present in the composition so that it no longer behaves like a simple liquid, as would be understood by the person skilled in the art.

In some instances, we have found that it is possible to obtain deodorant or antiperspirant sticks having good physical properties by cooling a deodorant or antiperspirant composition into a partially structured phase prior to its delivery into the container or mould.

The injection moulding processes and apparatus of the present invention therefore provide a means for producing good quality deodorant or antiperspirant sticks from deodorant or antiperspirant compositions which do not necessarily lend themselves readily to the known casting methods of manufacture, for example, formulations which would show significant sedimentation, and in particular, employing injection temperatures in the vicinity of the regular setting temperature of the composition. By so doing, it is possible to improve the distribution of particulates through the sticks, particularly the vertical distribution. Such a technique for producing an improved, i.e. more even, particle distribution in a stick enables the user to contemplate employing a particulate active having a larger average particle size than when employing an otherwise identical composition in a conventional casting process.

One of the benefits provided by the present invention is a reduction in the problems associated with shrinkage of the stick in the container or mould as the stick cools. This results in greater accuracy in replication of the surface contours and presents a more uniform appearance on exposed surfaces, such as when the stick barrels are top-filled or if refill sticks are produced for employment in re-usable barrels. The process renders it easier to contemplate stick designs that are more complex that the traditional round or oval cross-sectioned rods.

The deodorant or antiperspirant compositions of the present invention can typically be more viscous than those employed in prior art cast processes or other processes in which the composition is dispensed in the molten state, usually at considerably above its regular set temperature. Consequently, the invention process employing injection of the composition into the container or mould tends to employ a higher pressure than contemplated in the prior art gravity fed processes.

Injection Pressure

The pressure applied to the deodorant or antiperspirant composition in contact with the pressure applying means is referred to herein as the "applied pressure", and references "apply" and "applying" pressure to a deodorant or antiperspirant composition refer to the applied pressure. On account of the viscosity of the deodorant or antiperspirant composition, the pressure experienced by the composition further down the flow path may be lower.

"Injection pressure" is the pressure on the deodorant or antiperspirant composition exerted in the injection head at the point in time that the composition enters the container or mould.

It has been found that injection pressures can be used which are sufficiently high to deliver a deodorant or antiperspirant composition which is below its regular setting temperature into a container or mould without compromising the final structure of the antiperspirant or deodorant stick. As contemplated in the third aspect of the invention, use of injection pressures in excess of 15 psi ($1.034 \times 10^5$ Pa), and particularly in excess of 20 psi ($1.38 \times 10^5$ Pa) can allow relatively viscous compositions to be fed successfully into a container or mould. The injection pressure in the head is in many instances selected at above 100 psi ($6.89 \times 10^5$ Pa). Such a pressure offers practical benefits in injecting the antiperspirant or deodorant compositions, and particular when they are controlled to near or below their regular setting temperature.

Applied pressures, often in the order of up to 1000 psi ($6.89 \times 10^6$ Pa), may be used to deliver deodorant or antiperspirant compositions into the container or mould, the pressure usually being selected in accordance with the viscosity of the compositions. Relatively viscous (e.g. semi-solid) compositions normally warrant relatively high applied pressures in the region of or over 500 psi ($3.45 \times 10^6$ Pa). Excessive shear should be avoided during the delivery of the composition into the container or mould so as to avoid possibly irreversible breakdown of the structure, and at such pressures, excessive shear can be avoided by controlling process parameters such as temperature, flow rate and apparatus design.

The injection pressure is typically greater than 15 psi, usually greater than 20 psi, and often for more viscous compositions greater than 100 psi. The injection pressure is often calculated taking into account the rheology of the composition being injected. The injection pressure in the head is preferably controlled at below 600 psi ($4.14 \times 10^6$ Pa). This is not only in order to lower the risk of structure impaiment, but also to reduce or eliminate the risk of material being injected into the mould or especially into a barrel, at such a velocity that it bounces out to a significant extent. In particularly desirable embodiments, the injection pressure is at least 200 psi ($1.38 \times 10^6$ Pa) and in the same or other desirable embodiments, it is up to 400 psi ($2.76 \times 10^6$ Pa).

All psi pressure figures are psi gauge (psig), i.e. the level above or below atmospheric pressure.

Low shear injection under the controlled injection pressures indicated above is desirably employed in conjunction with a selected injection temperature, such as in the range of from about 3° C. below the regular setting temperature of the composition up to about 2° C. above its regular setting temperature.

It has been found that the problems associated with stick shrinkage in the container or mould may be ameliorated, if so desired, by delivering further deodorant or antiperspirant composition to the container or mould as its volume within the container or mould diminishes as it cools or becomes solid. One way to achieve this for sticks produced in a mould as distinct from in a container, is for a "holding pressure" to be placed on a small reservoir of the deodorant or antiperspirant composition in contact with the material in the mould. Additional composition is introduced under the holding pressure to compensate for shrinkage. In this manner, the total volume of material in the mould can be maintained during cooling and solidification of the material and shape reproduction further improved. Furthermore, use of a "holding pressure" minimises weld lines i.e. interfaces between flow fronts of deodorant or antiperspirant material inside the mould.

Thus, it is possible to obtain deodorant or antiperspirant sticks with reduced shrinkage and having good physical properties by applying a pressure to a deodorant or antiperspirant composition to deliver the deodorant or antiperspirant composition to a mould and continuing to apply the pressure on the deodorant or antiperspirant composition for a period after the mould has been filled.

The pressure created in the mould by continuing to apply pressure to a deodorant or antiperspirant composition entering a mould after it has been filled is herein referred to as the "holding pressure". The deodorant or antiperspirant compositions may be subjected to a similar holding pressure within the mould as the applied pressure. For example, such pressures may be up to 2000 psi.

The time over which a "holding pressure" is developed by continuing to apply pressure to the deodorant or antiperspirant composition after the mould has been filled is referred to herein as the "holding time". The holding time will vary depending on the properties of the deodorant or antiperspirant composition being delivered to the container or mould. For example, compositions being delivered to a container or mould in a molten state and at high temperatures may need a longer holding time than compositions which are delivered to a container or mould in a semi-solid state and/or at a lower temperature, and compositions which contract more may benefit from longer holding times in which compensatory additional composition is introduced. Typically, the holding time is less than 2 minutes, preferably short. The holding time may be very short, for example, less than 1 second.

Composition Temperature

It has been found that deodorant or antiperspirant compositions can be delivered into a container or mould at lower temperatures than those typically employed in casting operations, by subjecting them to pressure, without compromising the final structure of the deodorant or antiperspirant stick, by selecting appropriate injection conditions including as a significant factor, the temperature of the composition relative to its regular set temperature. Most deodorant or antiperspirant compositions for injection according to the instant invention have a regular melting temperature, which is usually not above 120° C. and which is usually significantly higher than its regular set temperature. Injection is often conducted at a temperature of at least 10° C. below its regular melting temperature. In practice, the temperature range within which a composition is injectable depends on the chemical constitution of that composition and the selection of the actual injection temperature takes that into account. Where the presence of structure in a deodorant or antiperspirant composition to be delivered to the mould can be clearly identified, and the deodorant or antiperspirant composition remains mobile without the application of excessive shear, the composition can be injection moulded. Excessive shear can be avoided at such temperatures by controlling process parameters such as flow rate and apparatus design.

Any practical deodorant or antiperspirant composition in stick form will be in a substantially solid state, i.e. set, at ambient and usually remain set at normal storage and/or use temperatures, which are normally in the range up to 20–40° C.

Accordingly, the deodorant or antiperspirant composition preferably enters the container or mould at a temperature above ambient, especially at above 30° C., more preferably above 40° C.

The temperature of the deodorant or antiperspirant composition on entry into the container or mould in an injection moulding process according to the present invention, and particularly aspects 2, 3 or 4, is normally chosen in conjunction with the composition constituents. In many instances, the injection temperature is selected within the range of from 40 to 95° C. It is highly desirable to control the temperature of the composition on entry into the container or mould to within the region of its regular set temperature, for example from about 3° C. below to 3° C. above its regular set temperature, and especially from about 3° C. below up to its regular set temperature. By way of example, desirable injection temperatures include about 1.0, 1.5 or 2° C. below the regular set temperature of the composition.

In many instances, the composition is often heated to a temperature above its regular melt temperature, possibly up to 30° C. above and in many instances from 5 to 20° C. above and thoroughly mixed, heat or oxidation sensitive constituents such as perfume advantageously being introduced into the composition only shortly before it is dispensed, and the composition is cooled during delivery to the dispensing station to a temperature between the set and melt temperature, and preferably within 3° C. of its regular set temperature and especially in the range of not more than 3° C. below its regular set temperature.

Of course, for any given composition under the same external conditions, the lower the temperature at which the composition enters the container or mould, the more quickly the stick sets and the less the tendency for the stick to shrink before it has set. It will also be recognised that that cooling of an antiperspirant or deodorant composition can often be carried out more efficiently whilst the composition is being delivered to the injection station, eg by a screw extruder compared with after it has entered the container or mould. This can result in a subsequent forced cooling zone such as a cooling tunnel becoming unnecessary, and this can be beneficial in commercial scale operation especially when plastics containers having poor heat conductance are employed.

Accordingly, in a further aspect of the present invention, a process for producing an antiperspirant or deodorant composition in a container comprises injecting the composition which is at least partially structured into a container, and preferably at a temperature in the range of within 3° C. of its regular set temperature and subsequently permitting the composition and container to cool without being subjected to forced cooling.

It is a particular advantage in many aspects of the present invention that the deodorant or antiperspirant composition is able to enter the container or mould at a lower temperature than in a simple casting technique. When heating amounts of solid deodorant or antiperspirant compositions continuously at the rate dictated by the rate at which it is continuous dispensed, less heat losses can arise. Moreover it is quicker and easier to control the temperature of the composition during its production and delivery compared with inside the container or mould. For that reason, less energy overall may be required, and also because the operating temperatures can be lower. The present invention therefore offers economy in operation.

Injection Moulding Apparatus

Injection moulding is a process which has been previously particularly used in the moulding of synthetic polymeric thermoplastic or thermoset articles, particularly thermoplastic articles having thin cross sections and complex shapes.

In essence, an injection moulding apparatus for plastic material comprises a substantially closed mould and a means for delivering the plastic material under raised pressure into the substantially closed mould. Preferably, there are means for raising the temperature of the plastic material to a temperature where the material is flowable under pressure. The process of the present invention can be carried out using low shear injection moulding apparatus that is capable of employing materials having a comparatively low viscosity, with or without any means for heating the feed. Preferred modifications according to the present invention are discussed below.

Deodorant or antiperspirant compositions according to the present invention can be injection moulded using an apparatus comprising a means for applying pressure to the deodorant or antiperspirant composition in the injector head so as to inject the composition into a container or mould. A "means for applying pressure" is defined as a device capable of containing a material and of applying a pressure to that material so as to force it into a container or mould. The container is open to the atmosphere.

Suitable types of apparatus that lend themselves to injecting a deodorant or antiperspirant composition into a container or mould include positive displacement pump-type arrangements such as, for example, piston pump, extruder, gear pump and lobe pump-type arrangements.

One suitable apparatus is a simple ram extruder in contact with a mould. Such an apparatus typically comprises a reservoir or barrel for the deodorant or antiperspirant composition, a plunger for applying pressure to the material in the reservoir and an exit port through which the deodorant or antiperspirant composition is impelled, directly or indirectly, into a mould, advantageously with suitable control to minimise or prevent wallslip. A ram extruder apparatus can be employed for injection moulding of deodorant or antiperspirant compositions for example when their temperature is only 1 or 2° C. below above their regular set temperature.

Injection moulding apparatus as described above may be used in the processes of the invention.

In a preferred embodiment, the deodorant or antiperspirant composition is preferably at least partially structured when delivered to the container or mould. Preferably, the deodorant or antiperspirant composition is in the semi-solid form when delivered to the mould, or within 2–3° C. of its regular set temperature. Of course, and particularly in the context of its first aspect, the present invention also contemplates deodorant or antiperspirant compositions to be injection moulded in a substantially fluid form.

Some deodorant or antiperspirant compositions can demonstrate undesirable aesthetic properties if they are injection moulded under the wrong conditions, and particularly when moulded at a temperature that is too low and a pressure that is excessive. That is to say, some deodorant or antiperspirant compositions which are solid when moulded under the correct conditions have a complex structure which can be disrupted if the solid is exposed to excessive shearing stresses during injection. The structure of the composition may not be re-established after such shearing, so that the deodorant or antiperspirant composition would remain in a soft or otherwise undesirable state.

It is accordingly highly desirable to ensure that such deodorant or antiperspirant compositions are not exposed to excessive shear during delivery to the mould.

In order to control the shear to which the deodorant or antiperspirant composition is subjected, the nature of the deodorant or antiperspirant composition itself needs to be taken into account, and in particular its viscosity and structure at various temperatures. To control the shear, it is desirable to control process parameters such as the temperature, pressure applied to the composition, flow rate of deodorant or antiperspirant composition in the apparatus and configuration of the apparatus. Configurations such as severe bends, constrictions and fast moving parts can subject the deodorant or antiperspirant composition to high shear, and accordingly it is advisable to avoid them.

It has been found that by delivering the deodorant or antiperspirant composition under pressure and at an appropriate temperature to the container or mould, it is possible to avoid a fully formed shear-sensitive structure, with the result that sticks can be produced from the compositions which retain adequate structure at room temperature.

Any suitable method may be used to control the temperature of the composition being injected into the container or mould. It may be supplied at a temperature suitable for delivery to the container or mould and require no alteration to its temperature. Alternatively, and preferably, the temperature of the composition is altered before or whilst it is fed to the container or mould by using heating or normally cooling means to respectively raise or lower the temperature of the composition as is appropriate.

Preferably, the state of the deodorant or antiperspirant composition is altered before or whilst it is being fed to the dispensing apparatus. For example, it may pass from a molten state to a more viscous state, eg by cooling the composition to close to or below its regular set temperature.

Any suitable cooling or heating means may be applied to the injection moulding apparatus in which the deodorant or antiperspirant composition is contained/passes during the injection moulding process.

Suitable heating and cooling means are well-known to the skilled person in the art. For example, a suitable cooling means is a cooling jacket containing a cooling medium, and suitable heating means include, for example, electrical heating jackets containing a heating medium or heat exchangers of various forms.

Advantageously, the temperature profile of the deodorant or antiperspirant composition is controlled such that it is initially sufficiently high to melt and keep molten its organic constituents, and is progressively cooled until immediately prior to the point of injection into the container or mould, it is in the region of its regular set temperature. The composition in the production and injection apparatus is maintained above its structure impairment temperature.

A plurality of separately controllable heating means or cooling means may be provided at different positions in the apparatus. A stepped temperature profile can then be provided in the direction of flow of deodorant or antiperspirant composition. For example, the temperature may increase or decrease in steps.

Deodorant or antiperspirant compositions for stick formation in accordance with the present invention are normally produced by mixing their constituents in the desired proportions under conditions providing a molten phase and feeding the resultant fluid mixture to apparatus dispensing measured amounts into containers or moulds. Consequently, a process for producing the sticks from the constituents of the compositions encompasses both means for feeding a fluid mixture as well as the means for applying pressure to the deodorant or antiperspirant composition.

Accordingly, the present invention provides an apparatus for forming a deodorant or antiperspirant stick comprising a means for applying pressure to a deodorant or antiperspirant composition to deliver the composition to a mould and a substantially separate means adapted to feed the deodorant or antiperspirant composition to the means for applying pressure to the deodorant or antiperspirant composition.

The feeding means can be considered to be substantially separate when no parts of the feeding means have any significant role in applying pressure to the deodorant or antiperspirant composition. In practice, the feeding means is suitably in fluid connection with the means for applying pressure to the deodorant or antiperspirant composition, whereby the deodorant or antiperspirant composition can be readily fed into the means for applying pressure.

Examples of suitable feeding means include a ram feeder, a screw extruder, possibly also acting as an in-line compounder or a combination thereof.

It is especially desirable in the present invention to employ a non-reciprocating screw extruder as the means for transporting the antiperspirant or deodorant composition, optionally with in-line compounding of the composition, to the apparatus which fills the mould or container, such as in particular by injection moulding, and especially to employ an extruder (preferably non-reciprocating) with twin intermeshing flights. Such extruders are particularly suited to the transportation of antiperspirant or deodorant compositions, under conditions controllable to minimise or avoid the risks of breakdown of the structure of the compositions during transportation, whilst enabling good mixing. On the other hand, reciprocating extruders can have an increased tendency to introduce gas (air) into antiperspirant or deodorant formulation during processing, which can impair the finish and homogeneity of the final stick.

When the deodorant or antiperspirant composition is provided to the injection moulding apparatus in a substantially mobile form, then a cooling zone can often be employed in the injection apparatus instead of or in addition to a heating zone. If molten composition is supplied at a temperature of at least 5° C. and such as 10° C. or more above the regular set temperature of the stick composition, it is preferably cooled prior to being delivered into the container or mould, and desirably to within 3° C. of the regular set temperature. Naturally, it will be understood that deodorant or antiperspirant compositions can be introduced into the container or mould at any appropriate temperatures and that furthermore, a heating apparatus could be used to maintain such a temperature, if need be.

It is a preferred feature of the feeding means that it is capable of supplying a continuous feed of deodorant or antiperspirant composition.

The means for feeding deodorant or antiperspirant composition may feed the composition to the means for applying pressure or to a zone preceding the means for applying pressure such as a heating or cooling zone. In a preferred embodiment, the means for feeding deodorant or antiperspirant composition feeds the composition into an accumulator zone which provides an interface between the continuous operation of the feeder and the discontinuous injection cycle of the pressure applying means.

Means for controlling the temperature of the deodorant or antiperspirant composition may be provided at any position in the injection moulding and feeder apparatus. For example, such heating or cooling means may be provided in the means for applying pressure, in the feeding means or in a separate zone, or in any combination thereof. A separate heating zone may be placed, for example, between the means for feeding deodorant or antiperspirant composition and means for applying pressure.

The present invention provides for the use of screw extruders in conjunction with the injection moulding apparatus, either as the feeding means, pressure applying means or both. In suitable apparatus, the means for applying pressure to the prepared (e.g. thermally heated) material is provided by the screw itself. Very preferably a twin co-rotating screw extruder is employed.

The means for applying pressure to the deodorant or antiperspirant composition may comprise the tip of a screw extruder, as described above for known injection moulding apparatus. Alternatively, separate means for delivering a composition under pressure can be used, as set out below.

Preferably, the means for feeding deodorant or antiperspirant composition comprises a feeder in the form of a screw feeder. This is found to give particularly smooth feed. Screw geometry may be designed to suit the formulation being processed. The rotational speed of the screw or screws is controllable to provide an acceptable flow rate of material to the accumulation zone or means for applying pressure, without applying unacceptable shear to the composition.

There are particular problems with conveying fluid deodorant or antiperspirant composition. Single screw extruders rely on drag flow for conveying, and therefore to convey fluids they need to be specifically designed with a close clearance and/or inclined so that gravity aids the forward flow of material. It is particularly preferred to have two parallel screws with intermeshing, preferably self-wiping flights which provide positive displacement to propel deodorant or antiperspirant composition forwards. The screws may rotate in opposite directions (counter-rotating) but are preferably co-rotating to reduce the reverse pressure flow and shear in the nip region. Such twin-screw extruders with intermeshing flights for delivering liquids or solids are known to the skilled person though not hitherto recognising expressly if they might be employed for mobile antiperspirant or deodorant compositions, nor recognising that such apparatus is capable of transporting and mixing (for in-line compounding) such antiperspirant or deodorant compositions during the generation of at least partial structure within the composition prior to its dispensing in subsequent filling apparatus. Twin-screw extruders are of particular benefit in transporting and mixing (in line compounding) antiperspirant or deodorant compositions having a typically limited content of particulate material, such as not more than 50% by weight, and often from 0 or 20% to 35% by weight particulates.

It is of practical importance to provide a pressure chamber in fluid contact with the feed means, eg a screw extruder as described above, where material can accumulate, comprising at least one wall defined by a piston which is movable to increase or decrease the volume of the pressure chamber, and in fluid contact with at least one injection nozzle.

In a preferred embodiment, the screw extruder, in-addition to feeding material for injection moulding into the means for applying pressure, will also perform the function of preconditioning the material to a desired physical state for injection. By providing the screw extruder such as those mentioned hereinbefore (and particularly a twin screw extruder) with one or more heating and/or cooling zones, and by selecting, for example, appropriate screws, pitches, screw alignment and screw speed, the material fed into the extruder can be intimately mixed and structured to whatever extent is required for the particular injection moulding process being used and product characteristics sought. For example, in a preferred embodiment of the present invention, material to be injected is in a substantially semi-solid state.

In addition, the feeding means, preferably a screw extruder, can contain intermediate ports for degassing and/or for adding further constituents. Additives, such as, for example, dyes and fragrances and materials which are readily oxidisable or are heat sensitive can also be added through appropriately located intermediate ports along the length of the screw feed.

By employing a screw feed with a temperature profile, and especially a temperature profile in which the temperature is high enough to melt meltable solids and the temperature is progressively lower towards the outlet from the screw feeder, it is possible to produce the composition from its constituents and introduce additives and/or materials which are readily oxidisable or are heat sensitive to the bulk flow of material in the feeder at a specific temperature, the temperature and location of addition points individually or together often being selected to minimise the likelihood of oxidation or degradation and/or the period in which it can take place. The temperature control especially to near the regular set temperature reduces or minimises the propensity of particulates in the composition to settle before a solid stick is formed.

The screw extruder can constitute a partial or complete in-line compounder. It is convenient when it acts as a partial compounder to use it to introduce the more readily oxidisable or heat sensitive constituents. By so doing it is possible to produce in a continuous manner a fluid deodorant or antiperspirant composition for dispensing, for example using a injection moulder. In addition, the material in the screw feed can be mixed and/or structured to a greater or lesser extent as it moves within the screw feed depending on the equipment and process parameters employed. It is thus possible to add constituents and/or additives and/or materials which are readily oxidisable or are heat sensitive to the bulk flow of material when it is at a chosen level of viscosity and/or mixing and/or structuring.

Accordingly, the screw extruder represents a convenient and readily controlled means for producing deodorant or antiperspirant composition continuously. By appropriately dimensioning the screw extruder and controlling the screw speed, it can produce a fluid composition at a rate that is matched with the rate at which the composition is dispensed, and in a form which is suitable for dispensing in an injection moulder, for example a composition which is at least partially structured.

Injection Nozzle

The means for applying pressure to the deodorant or antiperspirant composition can be connected to the container or mould by a simple passage, or a passage having non-return means or connections for bypass ducts, to allow quick withdrawal of the pressurizing means after the container or mould is filled and smooth operation of the apparatus.

In a preferred embodiment, however, the deodorant or antiperspirant composition is fed through a nozzle whose length is a significant proportion (at least half, preferably at least three quarters) of the length of the internal volume of the container or mould. It has been found that there can be a problem in simple filling with jetting or "snaking" of the material in the container or mould. By providing a nozzle which extends substantially to the distant end of the container or mould, good fill has been found to be possible. Preferably, the nozzle and container or mould move axially relative to each other whilst the deodorant or antiperspirant composition is being introduced into the container or mould. The container or mould may be moved with respect to the injection head and/or the nozzle may be moved with respect to the container or mould whilst the deodorant or antiperspirant composition is being delivered. The rate at which the nozzle and container or mould move relative to each other is preferably matched with the rate of delivery of the deodorant or antiperspirant composition, and where the cross section varies, the rate of movement takes into account the change in variation to the cross section of the container or mould so that the nozzle remains just below the surface of deodorant or antiperspirant composition in the container or mould. This has been found to give particularly good fill. In a preferred embodiment, the nozzle is moved with respect to the container or mould.

The nozzle may be heated or pre-heated in order, for example, to prevent any of the deodorant or antiperspirant composition solidifying (depositing) in the nozzle and thus inhibiting smooth delivery of the composition into the container or mould.

Preferably, the internal diameter of the injection nozzle for use with the means for delivering deodorant or antiperspirant composition under pressure is small, and in practice is principally constrained by the internal diameter of the container or mould or the aperture into the mould through which the composition is intended to be injected. In many instances, the nozzle internal diameter is in the range 1 to 20 mm, preferably 3 to 10 mm and of circular section. In other instances, the cross sectional shape of the nozzle can correspond to the internal shape of the container or mould.

Container or Mould

The container or mould of the present invention may be constructed of any suitable material, for example a rigid material with good mechanical strength. Where rapid cooling of a mould is desired, a material with high thermal conductivity may be preferred. Where the deodorant or antiperspirant composition is injected in the eventual container of the stick, the container often comprises a plastics material. Preferably, the container or mould comprises a material selected from metals and their alloys (for example, aluminium, brass and other copper alloys, steels including carbon and stainless steel), sintered forms of metals or metal composites, non-metallic materials such as ceramics, composites, and thermoplastic or thermosetting plastics, optionally in porous or foamed forms.

Moulds for sticks may also comprise non-rigid materials. For example, non-rigid plastics may be employed as a liner. For example, the inner lining of a rigid mould may comprise a "wrapper" for the deodorant or antiperspirant stick so that a wrapped stick is released from the mould. The mould may also comprise an expandable lining within a cavity defined by the mould, the lining expanding to fill the cavity as deodorant or antiperspirant composition is delivered to the mould. Such linings and wrappers that may be released with the stick can be integral parts of the product packaging, eg as indicated above, or may be removed once the sticks are released, in which case they may merely be used to facilitate easy release of the stick from the mould. Linings can also be employed to provide in-mould labeling of the sticks produced.

Containers for antiperspirant or deodorant sticks are commonly formed from thermoplastics materials and particularly materials which melt at a temperature significantly above the temperature at which the composition enters the container. Many such materials do not melt until they reach a temperature in the region of 100° C. or higher. Suitable materials comprise polyethylene, polypropylene, polyethylenephthalate. The containers are themselves often produced by injection moulding.

The container for deodorant or antiperspirant sticks often comprises a barrel, open at its top end through which the stick is projected for topical application to the skin and typically defining at its other end an aperture in which a piston is housed, and by relative axial movement of the piston along the barrel, the stick can be moved in order to expose more of the stick above the top of the container or to withdraw exposed stick into the container.

The container for sticks often further comprises a transport mechanism for moving the piston axially along the container. One conventional transport mechanism comprises a helically threaded aperture, usually at the centre of the piston, which engages with a similarly threaded rod which extends axially within the stick and which is mounted perpendicularly from and co-axially with a rotatable wheel or a pawl and ratchet mounted at the base of the container. On rotation of the wheel or depression of the pawl, the rod is rotated, the threads of the rod engage with the threads on the aperture in the embedded plate and the piston bearing the stick is moved axially. Other transport mechanisms known with in the art can also be employed.

If the container is filled through the bottom of the barrel, a closure for the open end of the barrel is normally provided, which can comprise a removable former, or a die. In some embodiments, the transport mechanism is introduced after bottom filling and preferably whilst the temperature of the stick is still above its set temperature. Alternatively, top filling of the barrel can be employed, and in such circumstances it is preferable for the transport mechanism to be in place during the filling operation.

The mould or container may be pre-cooled or preheated prior to delivery of deodorant or antiperspirant composition to the mould. The internal surface of the container/mould may be prechilled to a temperature, for example, below the delivery temperature of the composition. Such prechilling of the container/mould can provide for a smoother, more glossy finish to the sticks.

After filling with deodorant or antiperspirant composition, the container/mould can be cooled in a cooling zone to encourage rapid solidification of the composition, if desired. Any suitable coolant may be used, e.g. air, water, ice, solid carbon dioxide or liquid nitrogen or combinations thereof, depending on the speed of cooling and the end temperature desired. Preferably, when employing a mould, at least part of the external face of the mould is provided with a means to improve cooling efficiency of the mould after injection. In preferred embodiments of the invention, such means comprise fins or ribs for air cooling or jackets for circulation of a coolant liquid. However, as referred to hereinbefore, in a number of embodiments, and especially when filling directly into containers, the cooling zone is omitted.

A mould for use in the present invention suitably comprises at least two rigid complementary dies adapted to be fitted to each other and withstand the injection and holding pressure, each die corresponding to a respective portion of the desired shape of moulded article, said dies when in engagement along the contacting portion of their rims defining a cavity corresponding to the total shape of the moulded article. The use of multiple part moulds comprising at least two die parts allow s for the manufacture of highly diverse 3-dimensional shapes; for example circular, oval, square, rectangular, concave or any other form as desired.

In a mould comprising at least two die parts, at least one of said dies may be provided with a sealing means along the contacting portion of the rim thereof. More preferably, said sealing means comprises a gasket.

The mould is provided with an internal surface, the size and shape of which may vary depending on the form of the final product. The internal surface of the mould may be coated in part or in total with a material having good release characteristics, such as low surface energy. The thickness of the coating is preferably less than 1 mm, more preferably less than 50 microns. The internal surface of the mould may be flat, concave or convex or any other shape as desired. The shape may be such as to accommodate stick shrinkage without detracting from its final appearance, e.g. very convex surfaces can be used.

The internal surface of a reusable mould is optionally provided with mirror images of inscriptions or logos or figures desired on the surface of the moulded article, either as projections or depressions.

Leakage of material from moulds comprising die parts may be prevented by having the joining surfaces of the dies closely matching, e.g. by lapping or by tongue and groove or by providing a gasket. In the case of high viscosity materials, flat face contact is sufficient. The two dies are held together by the use of nuts and bolts or by some sort of clamping mechanism, for example a hydraulic mechanism. Alternatively the external surfaces of the die parts can slide on inclined planes into a separate housing means which enables the mould to withstand lateral forces. It is important that good seals are achieved when high applied and holding pressures are being used.

Typically, the mould is provided with a "gate", this being the opening in the mould through which deodorant or antiperspirant composition may be delivered to the mould cavity. The open end of a container naturally provides a gate. The deodorant or antiperspirant composition may be delivered from the pressure applying means into the container or mould via a runner (or sprue) channel. In this respect, it may be beneficial to heat or cool the runner channel to enable the composition to retain an appropriate temperature. The deodorant or antiperspirant composition may be delivered to the mould or container cavity directly without any runner channel. For example, it may be delivered directly through a nozzle.

The mould may comprise a "neck", a short channel separated from the mould cavity by the gate. The antiperspirant or deodorant composition may be delivered through the mould neck. Alternatively, a nozzle may enter the mould cavity via the neck and gate in order to deliver the composition.

In a mould comprising die parts, the gate and/or a neck may be totally present in one die part or may be formed on the engagement of two or more die parts. The gate opens on one side to the cavity and on the other side is adapted to be engaged, suitably by means of a nozzle entering the mould via a neck, to the pressure applying means.

The mould may be of such a design that it can be closed once it is full or once the material in the mould has solidified to the extent that an outer shell has formed. By making the mould air tight, shrinkage effects are controlled. In a preferred embodiment, the gate remains open whilst a pressure continues to be applied by the pressure applying means. The mould may be closed at the gate whilst the material inside the mould is still under pressure.

Containers for deodorant or antiperspirant sticks are conventionally in the form of barrels that are open at one end and closed at the other end by a mechanism to enable the stick to be moved along the barrel. The open end of the barrel conveniently serves as the gate. When filling into a barrel, the composition is injected under pressure in the injection head through the nozzle, but there is no significant holding pressure within the barrel.

The process may be carried out in a quasi-continuous manner by having a plurality of containers or moulds passing through a feed station where the deodorant or antiperspirant composition is injected under pressure in to each mould and subsequently taken through the steps of cooling to solidify the material further and, where necessary, demoulding before being recycled again. As a further option, a plurality of dispensing stations can be fed from a single production or delivery apparatus, such as in particular a screw extruder, for example through a manifold located after the accumulator. In injection moulding processes, it is generally necessary to provide a means for venting, i.e. removal of air from the mould, as the mould is filled. Mould venting is a technique employed in various known injection moulding processes, for example in the thermoplastics industry, and such techniques may also be suitably employed in the present invention as would be understood by the person skilled in the art. When the composition is injected into containers, the aperture though which it is filled is normally significantly greater than the injection nozzle, enabling venting to occur readily without any further provision.

Mould venting may be achieved by simply providing a venting means such as, for example, a small hole(s) or a slit(s) or a section(s) of air-porous material which are suitable positioned in the mould or at the interface of dies forming the mould and are optionally closeable.

In a preferred embodiment of the present invention, the nozzle is adapted to incorporate venting means such as channels running axially along most of the nozzle's length.

The injection moulding apparatus can be equipped with more than one injection head, such as two, which can inject composition simultaneously into the mould or container. Desirably, the composition injected through each injection head is different, for example visually, one being coloured and the other translucent or one being plain and the other marbled, or simply each having a different colour, such as one white and the other blue. This variation can be contemplated particularly when both of the compositions are injected at temperature close to their regular set temperatures, such as in the range of 3° C. above or preferably below the regular set temperature. The compositions are relatively viscous at such temperatures and have little opportunity to blend together before the stick solidifies. It is naturally preferable to select the compositions so that both will have similar regular set temperatures. By employing more than one nozzle, it is possible to produce sticks having stripes, especially if the nozzles and mould/container are moved axially relative to each other during the filling operation. Rotation of the heads about the axis of the container/mould can result in a swirl/stripe effect. Where the nozzle tips from the heads are concentrically positioned, a bullseye design can be achieved.

Stick Formulations

Suitable deodorant or antiperspirant compositions for employment in the present invention can include the following ingredients, %s herein being by weight based on the composition unless otherwise stated.:

A) Antiperspirant and/or Deodorant actives
  Ai) Antiperspirant actives, preferably in an amount of from 0.5–60%, particularly from 5 to 40% and especially from 10 to 35%.
  Aii) Deodorant actives, preferably from 0.01 to 20% and particularly from 0.1 to 5%
  of which at least one of Ai) and Aii) is present
B) Carrier, preferably from 5 to 95% and particularly from 20 to 60%
C) Structurant, preferably from 0.1 to 60% especially at least 0.5% and particularly from 1 to 25%
D) Additives, preferably from 1 to 50% and particularly from 5 to 30%.

Ai) Antiperspirant actives are often selected from astringent active salts, including in particular aluminium, zirconium and mixed aluminium/zirconium salts, including both inorganic salts and organic salts and complexes. Preferred astringent salts include aluminium, zirconium and aluminium/zirconium halides and halohydrate salts, such as chlorohydrates. Some especially preferred halohydrate salts comprise activated aluminium chlorohydrates such as those described in EP-A-6739 (Unilever NV et al) and other actives are described in EP-A-28853, the contents of both specifications being incorporated herein by reference.

Astringent aluminium salts include aluminium chloride and aluminium halohydrates having the general formula $Al_2(OH)_xQ_y.XH_2O$ in which Q represents chlorine, bromine or iodine, x is from 2 to 5 and x+y=6, x and y being either integers or non-integers and X being from 0 to 6.

A range of zirconium salts which can be employed in antiperspirant compositions herein is represented by the following empirical general formula: $ZrO(OH)_{2n-nz}B_z$ in which z is an integer or non-integer in the range of from 0.9 to 2.0, n is the valency of B, 2−nZ is at least 0 and B is selected from the group consisting of halides, including chloride, sulphamate, sulphate and mixtures thereof.

It will be recognised that the above-identified formulae for aluminium and zirconium salts are greatly simplified and encompass compounds having coordinated and/or bound water in various quantities as well as polymeric species and mixtures and complexes. In particular, zirconium hydroxy salts often represent a range of salts having various amounts of the hydroxy group, such as from about 1.1 to slightly in excess of 0 groups per zirconium atom.

Antiperspirant complexes based on the above-mentioned astringent salts are known and employable in the present invention. By way of example, complexes of aluminium, zirconium and aminoacids such as glycine are disclosed in U.S. Pat. No. 3,792,068 (Luedders et al). Certain of those complexes or complexes with related structures are commonly called ZAG in the literature. One particularly desired class of complexes which exhibit structure like ZAG comprise aluminium chlorohydrate, including that satisfying the formula $Al(OH)_5Cl.2H_2O$ complexed with aminoacids or other complexing agents. A preferred class of zirconium-based complexes which exhibit structures like ZAG comprise zirconylchlorohydrate of empirical formula $ZrO(OH)_{2-a}Cl_2.nH_2O$ in which a is a non-integer in the range of from 1.5 to 1.87 and n is from 1 to 7 complexed with amino acids or other complexing agents. The especially preferred aminoacid for complexing with the aluminium or zirconium salts to obtain complexes comprises glycine which satisfies the formula $CH_2(NH_2)COOH$. Activated ZAG complexes can be employed as antiperspirant active in the present invention, such as the materials disclosed in U.S. Pat. No. 5,486,347 (Callaghan et al).

Other actives which can be contemplated for employment as appropriate in compositions produced and/or dispensed in accordance with the present invention comprise astringent titanium salts.

The proportion of antiperspirant salt in the composition is normally calculated by weight on an anhydrous salt basis, i.e. excluding the weight of any water or complexing agent that may also be present.

The antiperspirant salts are often employed herein in particulate form, in compositions which do not comprise an aqueous phase. Such compositions are conveniently referred to as anhydrous or substantially anhydrous. The particle size of antiperspirant salts in such compositions often falls within the range of 1 to 200 micrometers. Smaller particles can be contemplated, eg 0.1 to 1 $\mu$m. Mean particle sizes for cast processes are often from 3 to 20$\mu$m. The propensity of the particulate salts to segregate increases as the particle size increases. Advantageously, and particularly in the context of dispensing the compositions in an injection moulding process at a temperature in the vicinity of the regular set temperature of the composition and especially within the range of 0–3° C. below the regular set temperature, it is possible to employ solids having a mean larger particle size than when similar compositions would be dispensed in a conventional cast process. That is because the selected process conditions minimise or at least ameliorate the likelihood of particle segregation. For example, the mean particle size of the antiperspirant active can be, if desired, from 5 to 50 micrometers larger than in a conventional cast process. The benefit of ameliorating particle sedimentation is more readily apparent for larger particle sizes, such as in the region of mean particle sizes of 20 to 100 $\mu$m and preferably 20 to 40 $\mu$m, or higher. The benefits from lessened sedimentation applies to other particulates to some extent, but is of particular value for actives. This reduces the proportion of very fine solids to be handled prior to incorporation of the solids into the antiperspirant compositions and can provide improved sensory properties to the stick.

It will be recognised that it is also possible to employ the antiperspirant active in aqueous solution, if desired. Such compositions normally adopt the form of emulsions. Structuring is usually applied to the continuous phase, but the disperse phase can also be structured too. The dispersed phase desirably has a droplet size chosen in the range of from 0.3 to 10 $\mu$m.

Aii) Herein a deodorant active indicates a material which is capable of killing microrganisms, particularly bacteria, and/or hindering their growth, i.e. including bactericides and bacteristats which either in themselves generate a malodour or which (more typically) promote the decomposition of secreted body oils into malodiferous compounds such as fatty acids. The deodorant actives include the aforementioned antiperspirant actives and additionally other inorganic or organic materials or mixture of organic and inorganic actives. Amongst organic antimicrobial materials, one commonly recognised class comprises short chain monohydric alcohols, often considered to comprise up to 4 carbons, of which ethanol is especially prominent and isopropanol is sometimes employed to replace all or a fraction of the ethanol. A further class comprises bi or polyhydric alcohols such as ethylene glycol or propylene glycol. It will be recognised that the two previous classes of antimicrobial materials can function also as a carrier for other components of the composition.

A still further class of deodorant actives comprises chlorinated aromatics, including biguanide derivatives, of which materials known as Triclosan, Triclorban and Chlorhexidine warrant specific mention. A yet another class comprises polymeric biguanide salts such as available under the trademark Cosmosil™. These two classes may be employed instead of or in addition to alcohols or polyols, and often in amounts selected in the range of from 0.001 to 1%, and particularly from 0.1 to 0.5% by weight.

Inorganic antimicrobial materials include zinc salts such as zinc oxide, hydroxide, carbonate, phenol sulphonate or ricinoleate, magnesium salts such as magnesium oxide, hydroxide, or carbonate, sodium bicarbonate, rare earth metal salts such as lanthanum oxide, hydroxide or carbonate or combinations of any two or more such salts.

B) The carrier that is incorporated in compositions employed herein comprises one or more liquid materials that is fluid at dispensing temperatures for the composition and can be gelled or otherwise structured by the structurant to provide a semi or solid product at use temperature, i.e. typically below 40 and usually below 30° C. Where one or more of the remaining constituents is itself fluid at dispensing temperatures, such as a short chain monohydric alcohol or di or polyol having a melting point of below 40° C., it can provide the carrier function as well and the presence of an additional carrier is optional. The carrier can be hydrophilic or hydrophobic or a mixture of both. In many embodiments, the carrier or a major fraction of the carrier is hydrophobic, generating an oil phase.

One class of carriers that has found particular favour in recent years, and which is particularly desirable in formulations in-line compounded and/or injection moulded in accordance with the present invention, comprises liquid siloxanes and particularly volatile polyorganosiloxanes, i.e. liquid materials having a measurable vapour pressure at ambient conditions. The polyorganosiloxanes can be linear or cyclic or mixtures thereof. Preferred cyclic siloxanes include polydimethsiloxanes and particularly those containing from 3 to 9 silicon atoms and preferably not more than 7 silicon atoms and most preferably from 4 to 5 silicon atoms, otherwise often referred to as cyclomethicones. Preferred linear siloxanes include polydimethylsiloxanes containing from 3 to 9 silicon atoms. The volatile siloxanes normally by themselves exhibit viscosities of below 10 centistokes, and particularly above 0.1 centistokes, the linear siloxanes normally exhibiting a viscosity of below 5 centistokes. The volatile silicones can also comprise branched linear or cyclic siloxanes such as the aforementioned linear or cyclic siloxanes substituted by one or more pendant —O—Si (CH$_3$)$_3$ groups. Examples of commercially available silicone oils which are employable include Dow Corning 344, Dow Corning 345 and Dow Corning 244, Dow Corning 245 and Dow Corning 246, (from Dow Corning Corporation) Silicone 7207 and Silicone 7158 (from Union Carbide Corporation) and SF1202 (from General Electric [US]). Volatile silicones are often present in a proportion of from 20 to 50%

The carrier employed in compositions herein can alternatively or preferably additionally comprise non-volatile silicone oils, which include polyalkyl siloxanes, polyalkylaryl siloxanes and polyethersiloxane copolymers. These can suitably be selected from dimethicone and dimethicone copolyols. Commercially available non-volatile silicone oils include Dow Corning 556 and Dow Corning 200 series. Non-volatile silicones are often present in not more than about 30% by weight of the composition, and preferably from 1 to 15% by weight. In many instances, when a non-volatile silicone oil is present, its weight ratio to volatile silicone oil is in the range of from 1:3 to 1:40.

Non-silicone organic carriers include liquid aliphatic hydrocarbons such as mineral oils or hydrogenated polyisobutene, often selected to exhibit a low viscosity. A further example of liquid hydrocarbons comprises polydecene. Other suitable carriers are liquid aliphatic esters containing at least one long chain alkyl group, such as esters derivable from C$_1$–C$_{20}$ alkanols esterified with a C$_8$ to C$_{22}$ alkanoic acid or C$_6$ to C$_{10}$ alkanedioic acid. Suitable esters include isopropyl myristate, lauryl myristate, isopropyl palmitate, diisopropyl sebacate and diisopropyl adipate, of which isopropyl palmitate is particularly favoured. In further instances, the carrier comprises aliphatic ethers derivable from at least one fatty alcohol, such as myristyl ether derivatives eg PPG-3 myristyl ether or lower alkyl ethers of polyglycols such as PPG-14 butyl ether. Mixtures of organic carriers can be employed.

Mixtures of silicone and non-silicone carriers can suitably be employed herein.

The carrier or mixture of carrier employed in the present invention can be and in many effective compositions is anhydrous, i.e. contain no free water. Alternatively, if desired, the composition can comprise water in addition to siliceous and/or organic non-siliceous carriers, such as those indicated hereinbefore. Aqueous formulations in practice would normally further comprise an emulsifying surfactant, such as an anionic and/or nonionic surfactant. The choice of emulsifing surfactant or mixture of surfactants is usually matched to the nature of the emulsion being formed, in accordance with known principles. The weight ratio of aqueous phase to oil phase is often chosen within the range of from 10:1 to 1:20. The emulsion may comprise either an oil in water or a water in oil emulsion. Where an emulsion is employed, it can be convenient to prepare the emulsion as a separate step before it is mixed with the remaining constituents of the composition.

C) The structurant or structurants that are included in compositions moulded by the processes described herein can comprise inorganic thickeners or organic structurants. The choice of structurant normally takes into account the chemical nature of the fluid phase which is being converted to a solid. The fluid phase to be structured is most commonly an oil phase, and especially an oil phase containing a silicone fluid, particularly a volatile silicone. Where an aqueous phase is also present, it can be desirable to thicken that phase also.

Organic structurants employable herein can be non-polymeric or polymeric. Non-polymeric structurants, including waxes and gellants, are often selected from fatty acids or salts thereof, often containing from 12 to 30 carbons such as stearic acid or sodium stearate, and/or fatty alcohols (typically insoluble in water) often containing from 12 to 30 carbons such as stearyl alcohol. Fatty herein indicates a long chain aliphatic group, such as at least 12 linear carbons, which is frequently not branched (linear) and is saturated, but which can alternatively be branched and/or unsaturated. It is possible for the fatty acid to contain an hydroxyl group, as in 12-hydroxystearic acid, for example as part of a gellant combination, and to employ amido or ester derivatives thereof. Examples of suitable higher molecular weight alcohols include behenyl alcohol and sterols such as lanosterol. Gellant indicates that the material gels the carrier. Other suitable gellants can comprise dibenzoyl alditols, of which a preferred representative comprises dibenzoyl sorbitol. Further suitable gellants comprise selected n-acyl amino acid derivatives, including ester and amide derivatives, such as N-lauroyl glutamate dibutylamide, which gellants often contemplated in conjunction with hydroxystearic acid or an ester or amide derivative thereof. Still further gellants include amide derivatives of di or tribasic carboxylic acids, such as alkyl N,N' dialkylsuccinimides, eg dodecyl N,N'-dibutylsuccinimide.

Other organic structurants can comprise waxes such as paraffin waxes, hydrogenated castor oil, Synchrowax™ HRC, Carnabau, beeswax, modified beeswaxes, microcrystalline waxes, polyethylene waxes and fatty ester derivatives of polyols, such as glycerol monostearate and related compounds. It is especially desirable herein to employ a wax structurant or mixture of wax structurants. Mixtures of the organic structurants can be employed, such as mixtures of a fatty acid/salt with a wax. Suitable choice of mixtures of structurants can reduce the visibility of antiperspirant/deodorant composition deposited in use on the skin.

Polymeric gellants which can be employed can comprise organo olysiloxane elastomers such as reaction products of a vinyl terminated polysiloxane and a cross linking agent or alkyl or alkyl polyoxyalkylene-terminated poly (methyl substituted) or poly(phenyl substituted) siloxanes. Other polymeric gellants can comprise polyacrylamides, polyacrylates or polyalkylene oxides, in part depending on whether the composition encompasses an aqueous phase in addition to a hydrophobic phase.

Where the composition comprises as a significant fraction of the carrier a monohydric alcohol and/or a di or polyol, it can be convenient to employ as thickener, at least in part, a dibenzoyl derivative of a saccharide, and especially dibenzoyl sorbitol.

Where the composition comprises as a significant fraction of the carrier a volatile silicone, it can be preferable to employ a siliceous elastomer and in particular a crosslinked polyorganosiloxane often particulate, obtained by crosslinking a vinyl terminated siloxane polymer or by otherwise introducing cross linking. In operation, the particulate polyorganosiloxane absorbs the volatile silicone and is conveniently employed in a weight ratio to the volatile silicone of from 1:3 to 1:20.

Inorganic thickeners are often selected from siliceous and alumino-siliceous materials including silicas and clays. These materials can also function as suspending or bulking agents. Examples of suitable silicas include fumed silicas. Suitable clays include bentonites, hectorites and colloidal magnesium aluminium silicates. Commercially available clays are available under the trademark Veegum (Vanderbilt Co) and synthetic hectorites under the trademark Laponite (Laporte). It is preferable to employ montmorillonite clays which have been hydrophobically surface treated, for example by reaction with an amine. Preferred hydrophobic-treated clays are available from Rheox, Inc under their Trademarks Bentone 38, Bentone 34, Pentone 27, Bentone 14 and Bentone LT.

Additional bulking agents/fillers which can be contemplated include particulate fillers including talc, sodium bicarbonate, starches, including corn starch, modified starches and mixtures thereof. The amount of such additional fillers/bulking agents is often not more than 15%, and preferably up to 10% such as 1 to 5% by weight.

D) For improving the consumer-perceived properties of the sticks, it may be desirable to incorporate additives into the formulation. Such additives can include fragrances and skin benefit agents. Skin benefit agents are products which will be deposited onto the skin when the deodorant or antiperspirant composition is applied to the skin and which will impart to or maintain desirable properties for the skin.

It is particularly preferred in some embodiments of the invention that the deodorant or antiperspirant compositions comprise skin benefit agents such as, for example, moisturising components. The benefit agent may exist as a single component phase or, more commonly, is miscible with some of the ingredients of the formulation, such as the oil phase.

The process of the invention is particularly suitable for the incorporation of benefit agents into a deodorant or antiperspirant composition, and in particular when the deodorant or antiperspirant composition is below its melt temperature. Preferably, benefit agent is added to the deodorant or antiperspirant composition in the means for feeding the deodorant or antiperspirant composition to the dispensing means. Where said means for feeding the deodorant or antiperspirant composition comprises a screw feed, the benefit agent may be added at any suitable position along the screw feed. Using the equipment of the present invention, where a temperature profile exists in the equipment, it is possible to control the temperature at which the benefit agent is added. It is therefore possible to introduce the benefit ingredient into a bulk flow of chosen viscosity. By using appropriate equipment and processing parameters, for example by appropriate temperature control, it is also possible to introduce the benefit agent into a bulk flow of material which has a chosen level of mixing and structuring.

Benefit agents include components which moisturise, condition or protect the skin. Suitable benefit agents include moisturising components, such as, for example, emollient/ oils. By emollient oil is meant a substance that softens the skin and keeps it soft by retarding the decrease of its water content and/or protects the skin. A significant proportion of skin benefit agents also are capable of providing other functions to the composition. Thus, many comprise oils which can act as carriers. Others are waxes and fatty acids or alcohols which can provide structure to an oil phase, either alone or in conjunction with other materials. It will be recognised from their description which other function they provide or contribute to.

Benefit agents also include wash-off agents incorporated to facilitate the removal of the antiperspirant or deodorant composition from human skin by washing with water. Such agents can be selected from non-ionic surfactants and particularly nonionic ester or ether surfactants comprising a polyoxyethylene moiety, often containing from about 2 to 80, and especially 5 to 60 oxyethylene units and a hydrophobic alkyl, alkenyl or aralkyl moiety, normally containing from about 8 to 50 carbons and particularly from 10 to 30 carbons. Such non-ionic surfactants can also be derived from a polyhydroxy compound such as glycerol. Examples of agents which offer wash-off benefits include ceteareth-10 to 25, ceteth-10-25, steareth-10-25, and PEG-15-25 stearate or distearate, Preferred benefit agents include:

Silicone oils, including linear and cyclic polydimethylsiloxanes; amino, alkyl, alkylaryl and aryl silicone oils. The silicone oil used may have a viscosity in the range 1 to 100,000 centistokes. The silicone oils can be either volatile oils, non-volatile oils or a mixture of both.

Low melting point silicone waxes, eg SF1642:

Fats and oils including natural fats and oils such as jojoba, soyabean, rice bran, avocado, almond, olive, sesame, persic, castor, coconut, mink, arachis, corn, cotton seed, palm kernel, rapeseed, safflower seed and sunflower oils; cocoa butter, beef tallow, lard; hardened oils obtained by hydrogenating the aforementioned oils; and synthetic mono, di and triglycerides such as myristic acid glyceride and 2-ethylhexanoic acid glyceride;

Waxes such as carnauba, spermaceti, beeswax, lanolin and derivatives thereof;

Hydrophobic plant extracts;

Hydrocarbons such as liquid paraffins, petrolatum, microcrystalline wax, ceresin, squalene and mineral oil;

Higher alcohols and fatty acids such as behenic, palmitic and stearic acids; lauryl, cetyl, stearyl, oleyl, behenyl, cholesterol and 2-hexadecanol alcohols;

Esters such as cetyl octanoate, cetyl lactate, myristyl lactate, cetyl palmitate, butyl myristate, butyl stearate, decyl oleate, cholesterol isostearate, myristyl myristate, glyceryl laurate, glyceryl ricinoleate, glyceryl stearate, alkyl lactate, alkyl citrate, alkyl tartrate, glyceryl isostearate, hexyl laurate, isobutyl palmitate, isocetyl stearate, isopropyl isostearate, isopropyl laurate, isopropyl linoleate, isopropyl myristate, isopropyl palmitate, isopropyl stearate, isopropyl adipate, propylene glycol monolaurate, propylene glycol ricinoleate, propylene glycol stearate, and propylene glycol isostearate;

Essential oils such as fish oils, mentha, jasmine, camphor, white cedar, bitter orange peel, ryu, turpentine, cinnamon, bergamont, citrus unshiu, calamus, pine, lavender, bay, clove, hiba, eucalyptus, lemon, starflower, thyme, peppermint, rose, sage, menthol, cineole, eugeniol, citral, citronelle, borneol, linalool, geraniol, evening primrose, camphor, thymol, spirantol, pinene, limonene and terpenoid oils;

Lipids such as cholesterol, ceramides, sucrose esters and pseudo-ceramides as described in EP-A-556 957;

Vitamins such as vitamin A and E, and vitamin alkyl esters, including those vitamin C alkyl esters;

Suncreens such as octyl methoxyl cinnamate (Parsol MCX) and butyl methoxy benoylmethane (Parsol 1789);

Phospholipids; and

Mixtures of any two or more of the foregoing skin benefit agents.

It will be recognised that a number of the materials encompassed herein with the term skin benefit agents can contribute to the provision of other functions. It should be understood that in determining the proportion of such a material to incorporate, the calculation should take into account both desirable functions. For example, where the chosen emollient can also function as a structurant, such as oleyl alcohol, the total proportion of that material should preferably be based on or similar to the larger proportion desired to provide one of the functions. For example, if 15% of oleyl alcohol is a desired proportion to provide structure and 5% of oleyl alcohol is sufficient to act as an "emollient", it would normally be convenient to employ about 15% oleyl alcohol, or possibly only a little more, on order to satisfy both functions.

The skin benefit agent such an emollient/oil is generally used in an amount from about 1 to 20%, preferably 1 to 15% by weight of the composition.

Other beneficial agents which can be incorporated comprise an anti-oxidant. Suitable examples include free radical inhibitors such as alkyl phenols e.g. butyl hydroxytoluene or ascorbic acid.

The compositions desirably, though not always, contain at least one perfume, which normally is incorporated within an oily phase in the composition, and typically is present in an amount of from 0 to 5% w/w, and in many instances from 0.2 to 2.5% w/w. The perfume can be introduced in its natural form, i.e. normally as an oil, or it can be encapsulated. A mixture of both forms of perfume can be employed.

In those aspects of the present invention employing injection of the formulation into a barrel or mould, it is particularly desirable for the formulation to contain not more than 50% by weight of solid particulate material, which in practice is dispersed in a fluid carrier above its solidification temperature. Such solid particulate material is normally considered to include one or more of antiperspirant active, and/or filler such as talc, clay or silica. It is typically inorganic, though the antiperspirant can contain an organic complexing agent. In many instances the proportion of particulate material is in the range of 0 to 35% by weight, and for antiperspirant formulations, especially 20 to 35% by weight. Naturally, the term particulates does not include organic gellants or waxes.

The present invention will be further described by way of the accompanying drawings.

DETAILED DESCRIPTION OF DRAWINGS

Figure 1:
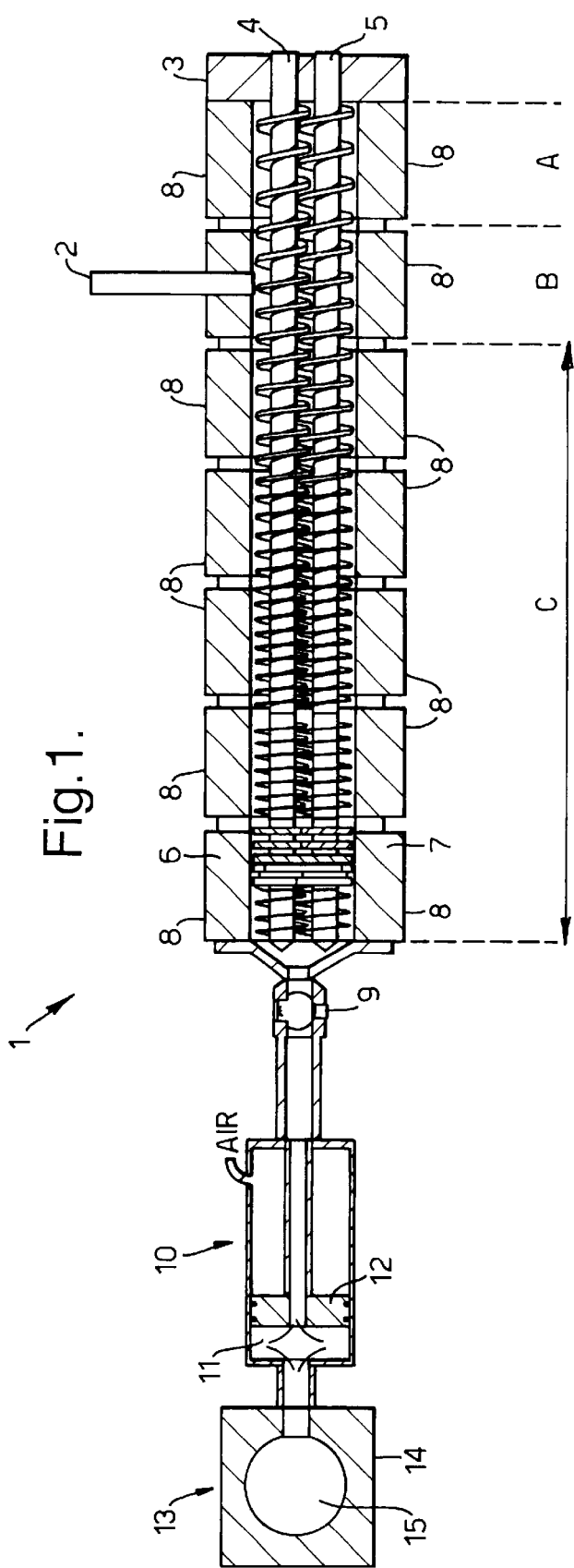
FIG. 1 shows apparatus for use in the method of the invention (plan view, twin-screw extruder).

FIG. 1 shows a plan view of one embodiment of the present invention comprising a twin screw extruder and an injection moulding apparatus. It is generally designated (1). The apparatus (1) is suitable for feeding deodorant or antiperspirant composition which is supplied in molten form.

A duct (2) is provided for receiving a feed of liquid deodorant or antiperspirant composition, for example from a prior step in the manufacturing process (not illustrated). The duct (2) feeds into a jacketed element (8) adjacent to one end of an extruder (3). In the extruder (3) there are two intermeshing, co-rotating feed screws (4), (5). At the end of the screws distant form duct (2), a set of medium shear mixing elements is provided, comprising three tri-lobe paddles (6) and three melting discs' (7) to provide back pressure and some mixing. Temperature control means are provided in jacketed elements (8) around the barrel of the extruder (3). The temperature control means comprise channels for liquid coolant, and electrical units for heating. The extruder (3) is divided into three zones, A, B and C. Temperature control means in zone A of the extruder are maintained at a low temperature, e.g. 30° C., to encourage the formation of solid deodorant or antiperspirant composition to seal the end of the shafts of the screws (4),(5). The temperature control means in the elements (8) in the zone marked B are at high temperature to maintain the deodorant or antiperspirant composition in fluid state to prevent blockages at the feed point of duct (2). The temperature control means in the elements (8) in the region marked C (i.e. the remainder of the extruder length) are for conditioning the deodorant or antiperspirant composition progressively to the desired temperature for dispensing.

At the outlet of the extruder (3), there is provided an in-line three-way valve (9), which can be used for sampling and recycle. When this valve is in the straight-through position, it is in fluid connection with an accumulator (10) comprising a cylindrical chamber (11) and a piston (12). The position of the accumulator piston (12) in the cylinder (11) varies according to the flow of material into and out of the accumulator. The accumulator (10) is in fluid connection with an injection head (13) comprising an injection chamber (14) which comprises a cylinder with a retractable piston (15). The injection head (13) has a nozzle (not illustrated in this Figure) which will be described in relation to FIG. 2 below. Pneumatic pressure behind the accumulator piston (10) keeps material in the accumulator (10) at constant pressure and provides a buffer between the continuous flow from the extruder (3) and the intermittent demands of the injection head (13). The three-way valve (9) and accumulator (10) are provided with temperature-controlled jackets.

In operation, a molten feed of deodorant or antiperspirant composition at a temperature above its melting point is fed through duct (2) and forced by the co-rotating screws (4), (5) in the direction of the solid-headed arrow through the connection (9) into the accumulator (10). The accumulator stores the material outletting from the extruder (3) and intermittently feeds it to the injection head (13) as demanded. Its temperature on reaching connection (9) is close to its regular setting temperature. During the first phase of injecting the material into a stick barrel (not illustrated), deodorant or antiperspirant stick material is accumulated in the accumulator (10) the material then flows into the injection chamber (14) as the piston (15) is displaced upwards. When a predetermined volume of deodorant or antiperspirant composition has been accumulated under the piston (15), the piston (15) is actuated downwardly by hydraulic pressure (not shown) whereby pressure is applied to the deodorant or antiperspirant composition within chamber (14) which is forced through the nozzle into the barrel (neither illustrated).

Figure 2:
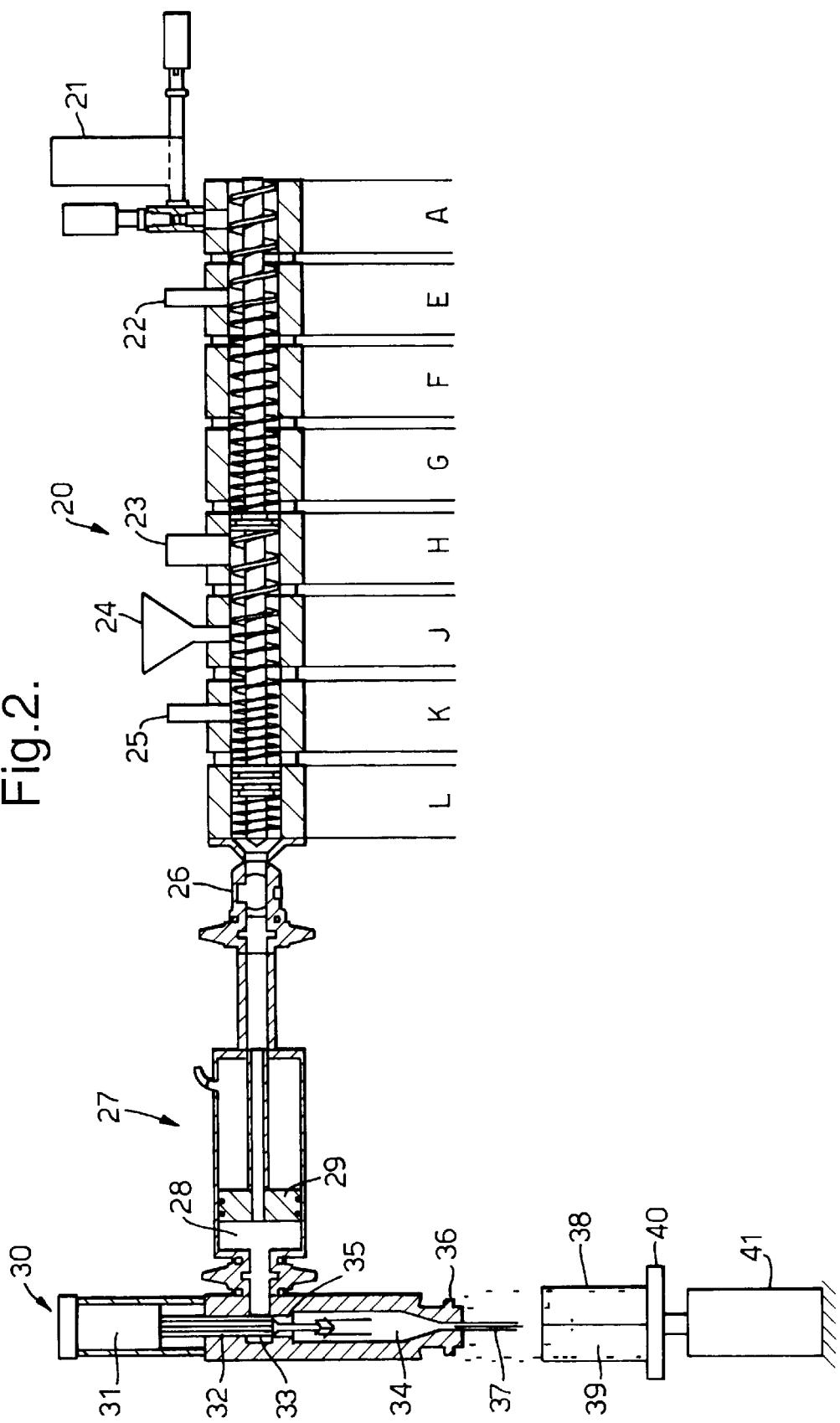
FIG. 2 shows a further apparatus in accordance with the present invention suitable for in-line compounding (side view, twin-screw extruder with in-line low shear injection head, degassing zones and solid-feed stuffer).

FIG. 2 shows a side view in cross section of an embodiment of the present invention suitable for in-line compounding. The apparatus comprises an extruder (20), with two intermeshing, co-rotating feed screws, each with a single flight as described in FIG. 1. The general configuration of the two intermeshing screws can be chosen to suit the particular application. At the end of the screws, a set of medium shear mixing and kneading elements is provided also as described in FIG. 1. The mixing and kneading elements can be interspersed between conveying screw elements of various pitch. Temperature control means, comprising channels for liquid coolant and electrical heating means, are provided by jacketed elements around the barrel of the extruder (as in FIG. 1).

The apparatus can accept liquid, semi-solid or solid materials as feed, depending on the feeding arrangement chosen. Particulate material such as structurant is fed into zone A of the extruder (20) via a solid feeder (21). Fluid materials are fed into zone E of the extruder (20) by a liquid feeding means (22). A degassing port (23) is illustrated in zone H of the extruder (20). At zone J of the extruder (20), a solid feeding means (24) for delivering solid deodorant or antiperspirant active or filler or adjuncts to the extruder is illustrated. At zone K, a duct (25) is shown for the introduction of liquid additives by a pump (not shown). Since the extruder zones can be interchanged, it should be understood that solids, liquids, and additive feeds may be introduced at any position along the length of the screw. One or a number of feeds may be supplied for a particular product.

At the exit of the extruder, is a three-way valve (26) used for sampling and recycle. When this valve is in the straight-through position, conditioned material from the extruder passes into an accumulator (27) comprising a cylindrical chamber (28) and an accumulator piston (29). The position of the piston (29) in the cylinder (28) varies according to the flow of material into and out of the accumulator. A pneumatic pressure behind the piston keeps material in the accumulator at constant pressure and thus provides a buffer between the continuous flow from the extruder (20) and the intermittent demands of the injection head (30). The three-way valve (26) and accumulator (27) are provided with temperature-controlled jackets.

The injection head (30) is positioned perpendicular to the extruder (20), with its axis vertical. It is provided with a means for temperature control (not shown).

The injection head (30) comprises a hydraulic actuator (31), a spindle (32) connected to the actuator, an inlet chamber (33), an injection chamber (34), a non-return ring check valve (35) and an injection valve (36). Also shown is the nozzle (37) and the mould (38) to receive the composition. The nozzle (37) and mould (38) can be pre-heated before injection, if required.

In charging mode, the injection valve (36) is closed. The pressure above the ring check valve (35) is greater than that below, and the valve moves to its lower seat. In this position material can flow through the ring check valve (35), between the injection spindle (32) and the cylinder wall. As the injection spindle (32) is moved hydraulically upwards by the movement of the actuator, prepared fluid material flows into the injection chamber (34). The charging process is complete when the spindle (32) is fully up.

The spindle diameter is minimised (within constraints of mechanical strength) to give maximum area for flow, and therefore exert minimal elongational shear on the flowing material.

When the pressure below the ring check valve (35) exceeds that above, the valve moves to its upper seat and isolates the injection chamber (34) from the inlet chamber (33). At this point the machine is charged for injection. This passive valve system removes the need for an inlet control valve, and provides for first-in first-out material flow to the mould.

In injection mode, the nozzle (37) extends into the mould cavity (39) of the mould (38) through its open top. The mould (38) is mounted on a plate (40), which is movable up and down by a hydraulic system (41) or manually, the injection valve (36) is opened. The cylinder (31) is hydraulically driven downwards and the pressure in the injection chamber rises to above that in the inlet chamber. This closes the ring check valve (35). As the spindle (32) moves downwards with the actuator, material flows from the injection chamber through the open injection valve and into the mould via the nozzle (37).

The rate of advance of the spindle (32) is linked to the rate of retraction of the plate (40). As a result, the mould (38) drops as the mould cavity (39) is filled with deodorant or antiperspirant composition. The deodorant or antiperspirant composition flowing under pressure tends to fill the bottom upwards of the mould cavity (39). The rate of retraction of the plate (40) is adjusted so that the tip of the nozzle (37) is always just below the surface of the deodorant or antiperspirant composition in the mould cavity (39). This gives good fill quality.

Alternatively, equally good fill quality is obtained by moving the nozzle (37) instead of the plate (40). The nozzle is moved to the base of the mould cavity (39) and raised out of the barrel as the mould cavity (39) is filled with deodorant or antiperspirant composition.

The volume of material delivered to the mould is determined by the stroke of the hydraulic actuator. The velocity of the material as it is delivered to the mould is determined by the hydraulic pressure.

The apparatus according to FIG. 2 is capable of generating an applied pressure in the injection head which is between 15 and 1000 psi and holding pressure up to 2000 psi.

Figure 3:
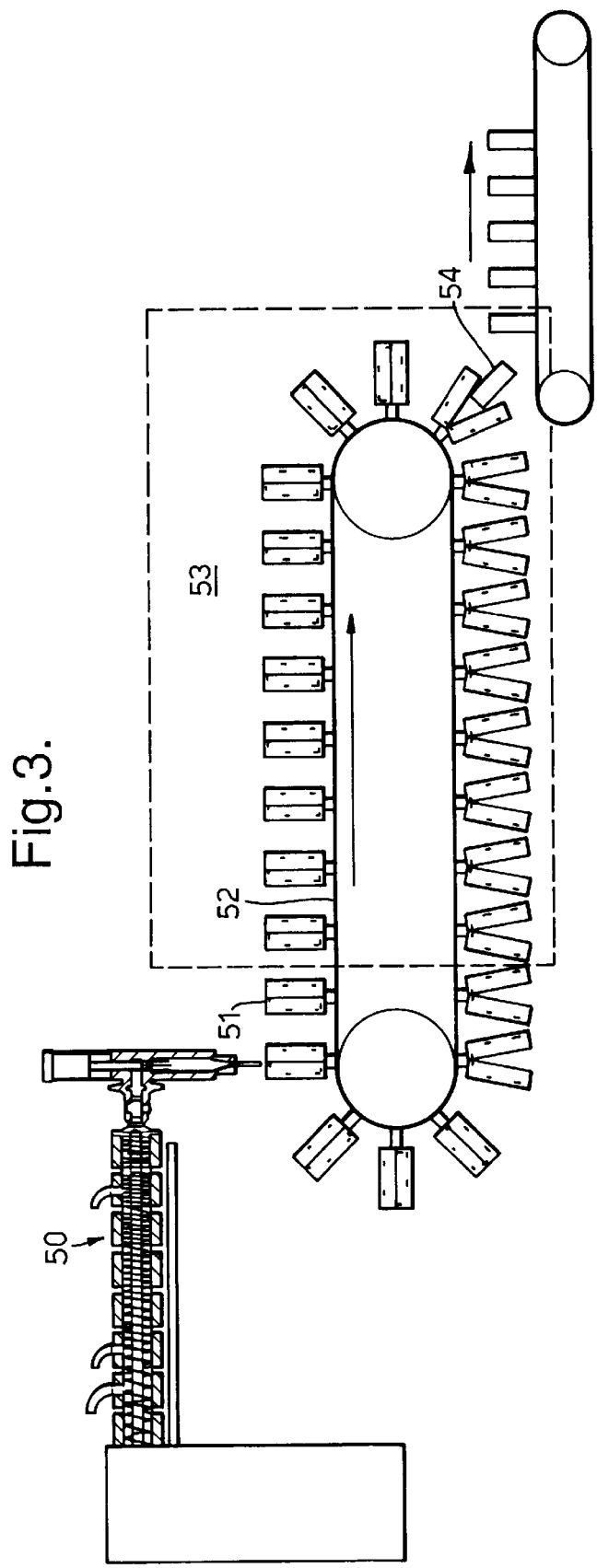
FIG. 3 shows a schematic illustration of a system for dispensing deodorant or antiperspirant compositions into moulds.

FIG. 3 illustrates in schematic form a moulding system in accordance with the invention comprising a feed station (50) and a plurality of the moulds (51) mounted on a conveyor (52) whereby the process of the invention carried out by circulating each said mould through the feed station (50) where the deodorant or antiperspirant formulation is injected in to the mould under pressure and subsequently cooled or permitted to cool within a cooling tunnel (53), the mould opened and the stick (54) removed.

The present invention will be further described by way of the following non-limiting examples:

EXAMPLES

Example 1

In Example 1, antiperspirant sticks of Formulation A summarised below were prepared employing apparatus according to FIG. 1, a Betol co-rotating twin screw extruder, having 40 mm diameter screws and eight temperature control zones leading via a connection valve to piston-type injection unit in which the connection valve and injection head were also temperature controlled. In this example, the extruder acted to transport the fluid antiperspirant composition to the injection unit.

| Formulation A | |
|---|---|
| Constituent | % by weight |
| Cyclomethicone | to 100% |
| Structuring Wax Blend | 18–20% |
| Nonionic ethoxylated ester surfactant | 0.5–2% |
| Al-Zr antiperspirant active | 23–25 |
| Talc | 2–4% |
| Perfume | 0.5–2% |

A batch of a composition within Formulation A was prepared in conventional equipment to produce a solid mass and subsequently melted in a conventional stirred heating jacketed vessel. It was maintained at a temperature of approximately 60 to 65° C. and fed in the form of a fluid mass via a metering pump into the Betol extruder. Zone A was controlled to about 30° C., in order to generate a solid block of material to minimise loss of the composition. In zone B of the extruder, the temperature was controlled at approximately 80° C., which resulted in complete melting of the waxes in the Formulation. The molten mass was conveyed through zone C by the screws rotating at rates of from 30 to 200 rpm, and cooled to a temperature selected in the range of from 43 to 51° C., at which it was fed into the injection moulding unit. The composition employed within Formulation A had a regular setting temperature of approximately 49° C. Sticks demonstrating the best quality expressed in terms of surface appearance and suitable hardness were obtained when the temperature of the formulation on injection was between 48 and 50° C. on entering the barrel. The process was repeated injecting into moulds. Other compositions within the Formulation have a similar regular set temperature, but in any event that temperature can be measured to indicate the best temperature to select for its injection into barrels or moulds in accordance with the present invention.

The structure of the stick obtained in Example 1 was compared with that obtained by casting the same composition under conventional processing conditions by visually inspecting cross-sections. In the stick produced by the invention process, a large number of small particles, considered to be structurant, were distributed reasonably evenly over the cross section. In a stick produced by a conventional casting technique of the same composition, three distinct zones were apparent, a core zone, a wall zone and an intermediate zone sandwiched between the core and wall zones. In the intermediate zone which contributed over half the surface area of the cross section, the standard pattern of radially extending structurant crystals was seen.

Example 2

In this Example, apparatus in accordance with FIG. 1 and substantially as described in Example 1, except that the twin screws each had a diameter of 30 mm, was employed to produce sticks from a composition within Formulation B. Formulation B was the same as Formulation A, except that the antiperspirant active was an Al-Zr antiperspirant active which had a larger average particle size than the active in Formulation A, and which was more prone to sedimentation.

The composition was injected into the barrels at a temperature selected in the range of 44 to 48.5° C. The products after they had cooled to ambient temperature were assessed as to their surface appearance, hardness and sedimentation of active. It was found that the sticks having the best properties were those which were injected at a temperature of from 46 to 48.5° C., compared with a regular set temperature of about 49° C., in that they exhibited acceptable resistance to sedimentation and showed good surface appearance and suitable hardness.

Example 3

In this Example, a composition within Formulation C as shown below was in-line compounded and injected into either barrels or moulds to form sticks using the process described below.

| Formulation C | |
|---|---|
| Constituent | % by weight |
| Cyclomethicone | to 100% |
| Blend of structuring waxes | 18–20% |
| Emollient oil | 6–9% |
| Nonionic ethoxylated ester surfactant | 0.5–2% |
| Al-Zr antiperspirant active | 20–25% |
| Talc | 6–10% |
| Perfume | 0.5–2% |

In this Example, sticks were made employing apparatus according to FIG. 2 and comprising a Werner & Pfleiderer co-rotating twin screw extruder having a plurality of temperature control zones, feeding an injection moulding apparatus having a low shear in-line injection head. The extruder had 30 mm diameter screws rotating at rates controlled within the range 30 to 200 rpm. In this Example, the extruder acted not only to transport the composition to the injection unit, but also as a continuous in-line compounder.

The composition within Formulation C above was compounded by feeding the constituents into the screw extruder in the following order:

The waxes were introduced via a volume feeder into zone A, then the silicone fluid and the emollient oil were pumped in via metered pumps into zone E. Zone A was maintained at approximately 30° C. as in Example 1. Zone E was heated to about 85° C. to melt the waxes. The remaining particulates, namely the antiperspirant active and the talc were introduced through a volume meter feeder in Zone J and the perfume was introduced via a gear pump in Zone K. The molten fluid composition in Zone E was progressively cooled through Zones F to L, F being controlled to about 80° C. G and H spanning and in the region of 70° C., J at about 65° C. K at about 60° C. and L at the temperature at which the material was fed to the injection moulding apparatus, as in Example 1 within a range of 46 to 59° C. at the point of entry into the barrel. The products were injected into barrels and after they had cooled to ambient temperature, were examined as to their surface appearance and hardness. Sticks were obtained having acceptable surface appearance and suitable hardness. The best sticks were obtained when the composition temperature at the point of injection was from 48 to 5° C., compared with a regular set temperature of 51° C. for the composition employed within Formulation C, ie as in Example 1, at a temperature in the range of 3° C. below the regular set temperature. The process was repeated, injecting into moulds, with very similar sticks resulting.

Example 4

In this Example, sticks were formed from the same composition as employed in Example 3, using the apparatus and method of operation of Example 1, but using the Werner & Pfleiderer co-rotating twin screw extruder, the screws having a diameter of 30 mm. The sticks obtained in this Example were very similar to those obtained in Example 3 at the same injection temperature.

Example 5

In this Example, sticks were obtained using a preblended composition within Formulation D employing the apparatus and general operating conditions of Example 1, except that the temperature in the zones A to L was higher than in Example 1 and the diameter of the screws was 30 mm.

| Formulation D | |
|---|---|
| Constituent | % by weight |
| Propylene glycol | to 100% |
| Denatured ethanol | 10–15% |
| Isostearyl alcohol | 10–15% |
| Dibenzoyl sorbitol | 1–5% |
| 3-amino-1-propanol | 0.2–1% |
| AL-Zr chlorohydrate glycine complex | 35–40% |

The constituents of the composition within Formulation D were preblended at ambient temperature and the mixture introduced via a metering pump into zone B where the temperature was controlled to about 120° C. to enable the dibenzoylsorbitol to melt completely. The temperature in zones F to K were controlled to progressively and quickly lower temperatures down to approximately 90° C. and zone L was controlled to the temperature at which the formulation was injected into the barrels, which were the same as in all the preceding Examples. Various injection temperatures ranging from 70 to 93° C. were employed. After the sticks had cooled to ambient, their properties were assessed, namely hardness, surface appearance, and clarity. The sticks showing the best combination of properties were obtained when the injection temperature of the composition within formulation D was approximately 75° C., compared with a regular set temperature for that composition of about 78° C.

Example 6

In this Example, a composition within Formulation E was compounded in line in a twin screw extruder according to FIG. 2 having 40 mm diameter screws rotating at constant rates selected in the range of 30 to 200 rpm and having a temperature profile similar to that for Example 3. The extruder fed an injection moulding head identical to that employed in Example 3. The method of operation was otherwise the same as in Example 3.

| Formulation E | |
|---|---|
| Constituent | % by weight |
| Cyclomethicone | to 100% |
| Emollient Oil | 12–18% |
| Blend of Structuring Waxes | 20–24% |
| Nonionic ethoxylated ester surfactant | 1–3% |
| Al-Zr antiperspirant active | 23–25% |
| Perfume | 0.5–2% |

The fluid mixture was injected into the barrels (identical to those used in Example 1) at an injection temperature of ranging from 45 to 62° C. and when the sticks had cooled to ambient, their properties were assessed. The sticks showing the best properties were obtained when the injection temperature was controlled to within the range of approximately 59.5 to 61.5° C., compared with a regular set temperature of about 62° C. The process was repeated, injecting into moulds, producing very similar stick products.

Example 7

In this Example, a composition with in Formulation F was compounded in line, employing the twin screw extruder and injection moulder of Example 3, operated under the temperature profile of Example 3.

| Formulation F | |
|---|---|
| Constituent | % by weight |
| Cyclomethicone | to 100% |
| Emollient or Humectant Oils | 17–22% |
| Blend of structurant waxes | 14–18% |
| Nonionic ethoxylated ester surfactant | 0.5–2% |
| Al-Zr antiperspirant active | 23–26% |
| Inorganic suspending agent | 1–3% |
| Talc | 1–3% |
| Perfume | 0.5–2% |
| Antioxidant | 0.01 to 0.1 |

The inorganic suspending agent and talc were introduced into zone A through a volume feeder. The waxes and carrier and emollient liquids were preblended and allowed to solidify The resultant solid mixture was then remelted externally and introduced into the extruder zone E via a CPEX meter pump. The antiperspirant active was introduced into zone J through a K-tron volume feeder. The perfume, antioxidant and a small fraction of the silicone were preblended and introduced into zone K via a ProMinent pump. The formulation was injected into the barrels at an injection temperature ranging from 45 to 58° C. The sticks were assessed as to hardness, surface quality and level of visible deposits when they had cooled to ambient. The sticks showing the best combination of properties were those obtained when the injection temperature was within the range of approximately 45 to 48° C., compared with a regular set temperature for that composition of about 48° C.

Example 8

In this Example, antiperspirant sticks of Formulation A were prepared using the temperature profile described in Example 1 but employing the extruder as described in Example 3 and the same injection unit as in Examples 1 and 3. The temperature of the formulation on injection was approximately at its regular setting temperature of 49° C. The pressure in the injection head was measured at 360 psi. The resultant sticks exhibited good surface appearance and hardness.

Example 9

In this Example, a batch of an aqueous emulsion Formulation G was produced in a conventional batch mixing apparatus and fed into apparatus according to FIG. 2 as described in Example 3 in which the twin screw transported the formulation at a controlled temperature profile into the injection moulding head of Example 3 and injected into barrels employing the injection unit and pressure conditions of Example 8. Trials were conducted in which the screw speeds were controlled at respectively 50 rpm, 100 rpm and 200 rpm and injecting at formulation temperature above and significantly below its regular setting temperature of 55° C. When the sticks had cooled they were examined as to their surface appearance and hardness. Sticks injected above the regular setting temperature (60–65° C.) have greater hardness than sticks injected at 45° C., indicating that the structure of the latter has been impaired by injecting at 10° C. below the regular setting temperature. Little difference in hardness was observed in the products formed from the formulations prepared at the different screw speeds.

Formulation G

| Constituent | % by weight |
|---|---|
| Cyclomethicone | 14% |
| Emollient Oils | 10% |
| Blend of structurant waxes | 20% |
| Nonionic surfactant | 0.5% |
| 50% w/w aqueous aluminium chlorhydrate | 40% |
| Perfume | 0.5% |
| water | 15% |

Example 10

In this Example, the Formulation G was produced by in-line compounding in the apparatus of FIG. 1, as described in Example 1, employing screw speeds of 100 rpm, 250 rpm and 350 rpm. The order of introduction of the constituents along the compounder was the structurant waxes and oils (silicone and emollient), aluminium chlorhydrate solution, emulsifier and water, and finally the perfume. The compounder had a temperature profile controlled in the first segment at 85° C., falling to 60° C. at the outlet. The resultant mixture was poured into barrels and allowed to set. The resultant sticks were examined at ambient temperature and were found to be readily useable sticks of acceptable hardness.

What is claimed is:

1. A process for forming deodorant or antiperspirant sticks comprising mixing deodorant or antiperspirant constituents to form a composition, simultaneously or subsequently heating the composition to form a mobile composition and delivering the mobile composition into a dispenser for filling containers or moulds wherein the mobile composition is produced continuously, by continuously introducing the deodorant or antiperspirant constituents through a plurality of inlets into a screw extruder at a rate matched with a rate of a mobile composition dispensation by the dispenser into the containers or moulds.

2. A process for forming deodorant or antiperspirant sticks comprising mixing deodorant or antiperspirant constituents to form a composition, simultaneously or subsequently heating a deodorant or antiperspirant composition to form a mobile composition and delivering the mobile composition into a dispenser for filling containers or moulds wherein the mobile composition is produced continuously, by continuously introducing the antiperspirant or deodorant constituents into a screw extruder having two parallel screws with intermeshing flights or a non-reciprocating screw extruder, at a rate matched with a rate of dispensation of mobile composition by the dispenser into the containers or moulds.

3. A process for forming deodorant or antiperspirant sticks comprising heating a deodorant or antiperspirant composition to form a mobile composition and delivering the mobile composition into a dispenser for filling containers or moulds wherein the mobile composition is transported continuously from a fluid supply to the dispenser by a screw extruder having two parallel screws with intermeshing flights or a non-reciprocating screw extruder, at a rate matched with a rate of dispensation of mobile composition by the dispenser into the containers or moulds, the screw extruder optionally being adapted to introduce thereinto one or more constituents of the antiperspirant or deodorant composition.

4. A process for forming deodorant or antiperspirant sticks comprising heating a deodorant or antiperspirant composition to form a mobile composition and delivering the mobile composition into a dispenser for filling a container or mould wherein the mobile composition is injected into the container or mould under a pressure of above 15 psi in an injection head for at least a fraction of the time in which the mobile composition is being introduced into the container or mould.

5. A process for forming deodorant or antiperspirant sticks comprising heating a deodorant or antiperspirant composition to form a mobile composition and delivering the fluid composition to a dispenser for filling a container or mould wherein the mobile composition has a temperature that is higher than its structure impairment temperature and below its regular melting temperature at the time when it is injected into the container or mould.

6. A process for forming deodorant or antiperspirant sticks comprising heating a deodorant or antiperspirant composition to form a mobile composition and delivering the mobile composition to a dispenser for filling a container or mould wherein the mobile composition is at least partially structured at the moment that it is injected into the container or mould.

7. A process according to claim 2 wherein the constituents of the deodorant or antiperspirant composition are mixed in a continuous mixer before they are fed into the dispenser.

8. A process according to claim 7 wherein the mobile composition is produced at a rate matched with the rate at which it is immediately dispensed by the dispenser into the container or mould.

9. A process according to claim 7 wherein the mixing is carried out in a screw extruder.

10. A process according to claim 9 wherein the constituents of the deodorant or antiperspirant composition are fed into the screw extruder at entry points spaced along the axis of the screw extruder.

11. A process according to claim 9 wherein the screw extruder is capable of heating the constituents to and maintain them in a mobile state.

12. A process according to claim 11 wherein the screw extruder comprises a plurality of segments, each of which is temperature controllable.

13. A process according to claim 12 wherein the temperatures of the segments in the screw extruder are controlled to provide a molten composition in the segment in which a meltable solid is introduced and the temperature falls progressively towards the segment from which the composition leaves the extruder.

14. A process according to claim 10 wherein a temperature sensitive constituent is introduced through the last entry point into the screw extruder.

15. A process according to claim 10 wherein the composition on leaving the extruder has a temperature that is higher than its structure impairment temperature and below its regular melting temperature.

16. A process according to claim 15 wherein the composition on leaving the extruder has a temperature of not more than 5° C. above its regular set temperature, and preferably from 0 to 3° C. below its regular set temperature.

17. A process according to claim 1 wherein the screw extruder comprises two parallel screws with intermeshing flights.

18. A process according to claim 1 wherein the deodorant or antiperspirant composition is at a temperature of not more than 5° C. above its regular set temperature when it enters the container or mould.

19. A process according to claim 18 wherein the deodorant or antiperspirant composition is at a temperature selected in the range of from 40 to 95° C. when it enters the container or mould.

20. A process according to claim 18 or 19 wherein the deodorant or antiperspirant composition has a temperature of from 0 to 3° C. below its regular set temperature when it enters the container or mould.

21. A process according to claim 1 wherein the deodorant or antiperspirant composition is in a substantially semi-solid form when injected under pressure into the container or mould.

22. A process according to claim 1 wherein the mobile deodorant or antiperspirant composition is injected employing an injection head pressure of up to 600 psi.

23. A process according to claim 1 wherein the deodorant or antiperspirant composition is cooled whilst or before it is fed to the container or mould.

24. A process according to claim 1 wherein the composition is fed into a mould and pressure on the deodorant or antiperspirant composition continues to be applied for a period after the mould has been filled.

25. A process according to claim 1 wherein the composition is injected into the eventual container for the deodorant or antiperspirant stick.

26. A process according to claim 25 wherein the container is filled through the eventual top of the container.

27. A process according to claim 26 wherein the container comprises a sidewall defining a barrel and a base plate that is moveable axially within the barrel.

28. A process according to claim 25 wherein after filling, the container is not subjected to forced cooling.

29. A process according to claim 25 wherein the container is filled though the eventual bottom of the container.

30. A process according to claim 29 wherein after the container has been filled, a mechanism for moving the deodorant or antiperspirant stick relative to the container is inserted in the base of the container before the composition has set.

31. A process according to claim 1 wherein the deodorant or antiperspirant stick is structured with a wax structurant or mixture of wax structurants.

32. A process according to claim 1 wherein the deodorant or antiperspirant stick is structured with an organic gellant.

33. A process according to claim 1 wherein the deodorant or antiperspirant stick comprises not more than 50% by weight particulate material.

34. An apparatus for forming a deodorant or antiperspirant stick comprising:
   a) a heated mixer for preparing continuously a mobile deodorant or antiperspirant composition by introducing antiperspirant or deodorant constituents through a plurality of inlets into a screw extruder;
   b) containers or moulds to receive the mobile deodorant or antiperspirant composition;
   c) a means to deliver the mobile deodorant or antiperspirant composition into said containers or moulds from said mixer, said mixer preparing said mobile deodorant or antiperspirant composition at a rate and said means delivering said mobile deodorant or antiperspirant composition into said containers or moulds at a rate, said rates being matched with each other.

35. An apparatus for forming a deodorant or antiperspirant stick comprising:
   a) a container or mould to receive a mobile deodorant or antiperspirant composition;
   b) a reservoir or production means to supply the mobile deodorant or antiperspirant composition to the container or mould; and
   c) a means to deliver the mobile composition to said container or mould, said means being capable of delivering the composition at a pressure, at the point of entering the container or mould, in excess of 15 psi or at a temperature that is higher than the structure impairment temperature and below the regular melt temperature of the composition.

36. An apparatus according to claim 34 adapted to carrying out the process in a continuous manner by having a plurality of containers or moulds passing through a feed station where the mobile deodorant or antiperspirant composition is delivered under pressure into each container or mould.

37. An apparatus for forming a deodorant or antiperspirant stick comprising a means for applying pressure to a deodorant or antiperspirant composition to deliver the mobile deodorant or antiperspirant composition to a container or mould and a substantially separate means adapted for feeding the mobile deodorant or antiperspirant composition to the means for applying pressure.

38. An apparatus according to claim 37 wherein the feeding means comprises a screw extruder.

39. An apparatus according to claim 38 wherein the screw extruder comprises two parallel screws with intermeshing flights.

40. An apparatus according to claim 38 wherein the screw extruder is non-reciprocating.

41. An apparatus according to claim 33 which further comprises a means for adjusting the temperature of the mobile deodorant or antiperspirant composition.

42. An apparatus according to claim 33 which develops a pressure in the injection head of up to 600 psi.

43. An apparatus according to claim 34 wherein the mobile deodorant or antiperspirant composition is fed from the means for applying pressure to the deodorant or antiperspirant composition to a nozzle whose length is a significant proportion of the length of the internal volume of the container or mould, the nozzle and the container or mould being capable of moving relative to each other whilst the mobile deodorant or antiperspirant composition is entering the container or mould.

44. An apparatus according to claim 43 wherein the nozzle is fluted.

45. A method for incorporating an oxidisable additive or heat sensitive agent into a deodorant or antiperspirant stick, comprising adding the additive or agent to a deodorant or antiperspirant composition which is at a temperature close to its regular set temperature and applying a pressure to the deodorant or antiperspirant composition containing the additive or benefit agent so as to deliver it as a mobile composition to a container or mould.

46. A process for ameliorating or controlling sedimentation of a particulate material during formation of a deodorant or antiperspirant stick comprising producing a mobile deodorant or antiperspirant composition containing a dispersed particulate material, delivering the mobile composition into a container or mould and thereafter cooling the mobile composition or allowing it to cool until it has solidified wherein the composition containing the dispersed particulate material is brought to a temperature in the vicinity of its regular set temperature and delivered under pressure into the container or mould.

47. A deodorant or antiperspirant stick comprising a particulate material distributed in a solidified carrier wherein the particulate material is less sedimented than in a stick of the same composition produced by a conventional cast process.

48. A deodorant or antiperspirant stick comprising a particulate material distributed in a solidified carrier wherein the particulate material has a mean particle size of form 20 to 100 µm.

49. A stick according to claim 47 wherein the particulate material is an antiperspirant active.

50. A stick according to claim 48 wherein the particulate material has a mean particle size of 20 to 40 µm.

51. A process according to claim 33 wherein-the deodorant or antiperspirant stick comprises from 0 to 35% by weight particulate material.

52. An apparatus according to claim 42 which develops a pressure in the injection head of from 200 to 400 psi.

53. An apparatus according to claim 22 which develops a pressure in the injection head of from 200 to 400 psi.

* * * * *